United States Patent  
Sawada et al.

(10) Patent No.: US 12,090,991 B2  
(45) Date of Patent: Sep. 17, 2024

(54) VEHICLE CONTROL METHOD AND VEHICLE CONTROL DEVICE

(71) Applicant: Nissan Motor Co., Ltd., Yokohama (JP)

(72) Inventors: Takanobu Sawada, Kanagawa (JP); Yasuhiro Yamauchi, Kanagawa (JP); Hisayoshi Matsuoka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 361 days.

(21) Appl. No.: 17/617,964

(22) PCT Filed: Jul. 2, 2019

(86) PCT No.: PCT/IB2019/000673  
§ 371 (c)(1),  
(2) Date: Dec. 10, 2021

(87) PCT Pub. No.: WO2021/001672  
PCT Pub. Date: Jan. 7, 2021

(65) Prior Publication Data  
US 2022/0242395 A1 Aug. 4, 2022

(51) Int. Cl.  
*B60W 20/00* (2016.01)  
*B60W 20/17* (2016.01)  
*B60K 6/46* (2007.10)

(52) U.S. Cl.  
CPC ............... *B60W 20/17* (2016.01); *B60K 6/46* (2013.01); *B60W 2510/244* (2013.01); *B60W 2520/28* (2013.01); *B60W 2540/18* (2013.01); *B60W 2710/06* (2013.01); *B60Y 2200/92* (2013.01)

(58) Field of Classification Search  
CPC .......... B60W 20/17; B60W 2510/244; B60W 2520/28; B60W 2540/18; B60W 2710/06; (Continued)

(56) References Cited

U.S. PATENT DOCUMENTS

2008/0249689 A1* 10/2008 Matsumoto ............. F16F 15/02  
701/36  
2013/0066495 A1* 3/2013 Furuta ................... B60W 20/13  
903/930

(Continued)

FOREIGN PATENT DOCUMENTS

CN 102991365 A 3/2013  
CN 108973573 A 12/2018  
(Continued)

OTHER PUBLICATIONS

Chinese Office Action of Nov. 3, 2023 of corresponding Chinese Patent Application No. 201980098060.2.

*Primary Examiner* — Peter D Nolan  
*Assistant Examiner* — Peter Y Ning  
(74) *Attorney, Agent, or Firm* — Global IP Counselors, LLP

(57) ABSTRACT

By the vehicle control method, in a vehicle provided with wheel, a sensor that acquires rotation speed of the wheel, and a sound generation device that generates sound as the sound generation device is driven, the angular acceleration of wheel is obtained from the rotation speed acquired by a sensor, and a sound generation device is controlled such that the generated sound becomes louder when conditions are met. Cases in which the angular acceleration is high are included in the conditions.

6 Claims, 19 Drawing Sheets

(58) Field of Classification Search
CPC .. B60W 2520/10; B60W 20/15; B60W 50/14; B60W 2510/0638; B60W 2552/05; B60W 2552/40; B60W 2710/0644; B60W 10/08; B60W 10/26; B60W 10/30; B60W 20/14; B60W 10/06; B60K 6/46; B60Y 2200/92; B60Q 5/00; B60Q 9/00; Y02T 10/40; Y02T 10/62
See application file for complete search history.

(56) References Cited

U.S. PATENT DOCUMENTS

| | | | |
|---|---|---|---|
| 2018/0345979 A1* | 12/2018 | Abdossalami | B60W 40/064 |
| 2019/0160866 A1* | 5/2019 | Miura | B60B 21/12 |
| 2021/0122356 A1* | 4/2021 | Kanno | B60W 10/24 |

FOREIGN PATENT DOCUMENTS

| | | | | |
|---|---|---|---|---|
| EP | 4249337 A1 * | 9/2023 | ............... | B60K 6/44 |
| JP | 2004-48844 A | 2/2004 | | |
| JP | 2004048844 A * | 2/2004 | | |
| JP | 2008-254538 A | 10/2008 | | |
| JP | 2011218872 A * | 11/2011 | | |
| JP | 2013-56613 A | 3/2013 | | |
| JP | 2015-166220 A | 9/2015 | | |
| JP | 2015166220 A * | 9/2015 | | |
| JP | 2018-538558 A | 12/2018 | | |
| JP | 2019-16971 A | 1/2019 | | |
| JP | 2019016971 A * | 1/2019 | | |
| JP | 2019-98758 A | 6/2019 | | |
| WO | WO-2021001672 A1 * | 1/2021 | ............... | B60K 6/46 |

* cited by examiner

20Km/h

STEERING ANGLE (θ)

| STEERING SPEED (θ/S) | | 0 | 90 | 180 | 270 |
|---|---|---|---|---|---|
| | 0 | 1 | 1 | 1 | 1 |
| | 100 | 1 | 0.9 | 0.8 | 0.6 |
| | 200 | 1 | 0.8 | 0.7 | 0.5 |
| | 300 | 1 | 0.7 | 0.5 | 0.3 |
| | 400 | 1 | 0.5 | 0.3 | 0.1 |

40Km/h

STEERING ANGLE (θ)

| STEERING SPEED (θ/S) | | 0 | 90 | 180 | 270 |
|---|---|---|---|---|---|
| | 0 | 1 | 1 | 1 | 1 |
| | 100 | 1 | 0.8 | 0.7 | 0.5 |
| | 200 | 1 | 0.7 | 0.6 | 0.4 |
| | 300 | 1 | 0.6 | 0.4 | 0.2 |
| | 400 | 1 | 0.4 | 0.2 | 0 |

60Km/h

STEERING ANGLE (θ)

| STEERING SPEED (θ/S) | | 0 | 90 | 180 | 270 |
|---|---|---|---|---|---|
| | 0 | 1 | 1 | 1 | 1 |
| | 100 | 1 | 0.6 | 0.5 | 0.3 |
| | 200 | 1 | 0.5 | 0.4 | 0.2 |
| | 300 | 1 | 0.4 | 0.2 | 0 |
| | 400 | 1 | 0.2 | 0 | 0 |

FIG. 17

VEHICLE CONTROL METHOD AND VEHICLE CONTROL DEVICE

CROSS-REFERENCE TO RELATED APPLICATIONS

This application is a U.S. national stage application of International Application No. PCT/IB2019/000673, filed on Jul. 2, 2019.

BACKGROUND

Technical Field

The present invention relates to a vehicle control method and a vehicle control device.

Background Information

JP 2018-538558A discloses an active road noise control system that uses the acceleration detected by an acceleration sensor coupled to a body side of a vehicle with respect to a suspension device disposed between the vehicle body and a wheel, thereby generating a noise reduction sound to reduce noise in the vehicle body.

SUMMARY

According to the technology disclosed in JP 2018-538558A, the acceleration sensor that detects the vehicle state is positioned on the vehicle body side above the suspension provided between a wheel and the vehicle body. However, noise that is generated in the vehicle as a result of travel is mainly road noise that is generated between the wheels and the ground contact surface. Therefore, because noise is absorbed by the suspension, there is the problem that the source of the noise cannot be directly observed, and thus cannot be appropriately controlled.

According to the vehicle control method of the present invention, in a vehicle comprising a wheel, a sensor that acquires the rotation speed of the wheel, and a sound generation device that generates sound when driven, the angular acceleration of the wheel is determined from the rotational speed acquired by the sensor, and the sound generation device is controlled such that the generated sound becomes louder if conditions are met. The conditions include high angular acceleration.

BRIEF DESCRIPTION OF THE DRAWINGS

Referring now to the attached drawings which form a part of this original disclosure.

FIG. 17 is a table showing correction coefficients used to correct the variance threshold.

EMBODIMENTS FOR IMPLEMENTING THE INVENTION

Embodiments of the present invention will be described below with reference to the drawings.

First Embodiment

Figure 1:
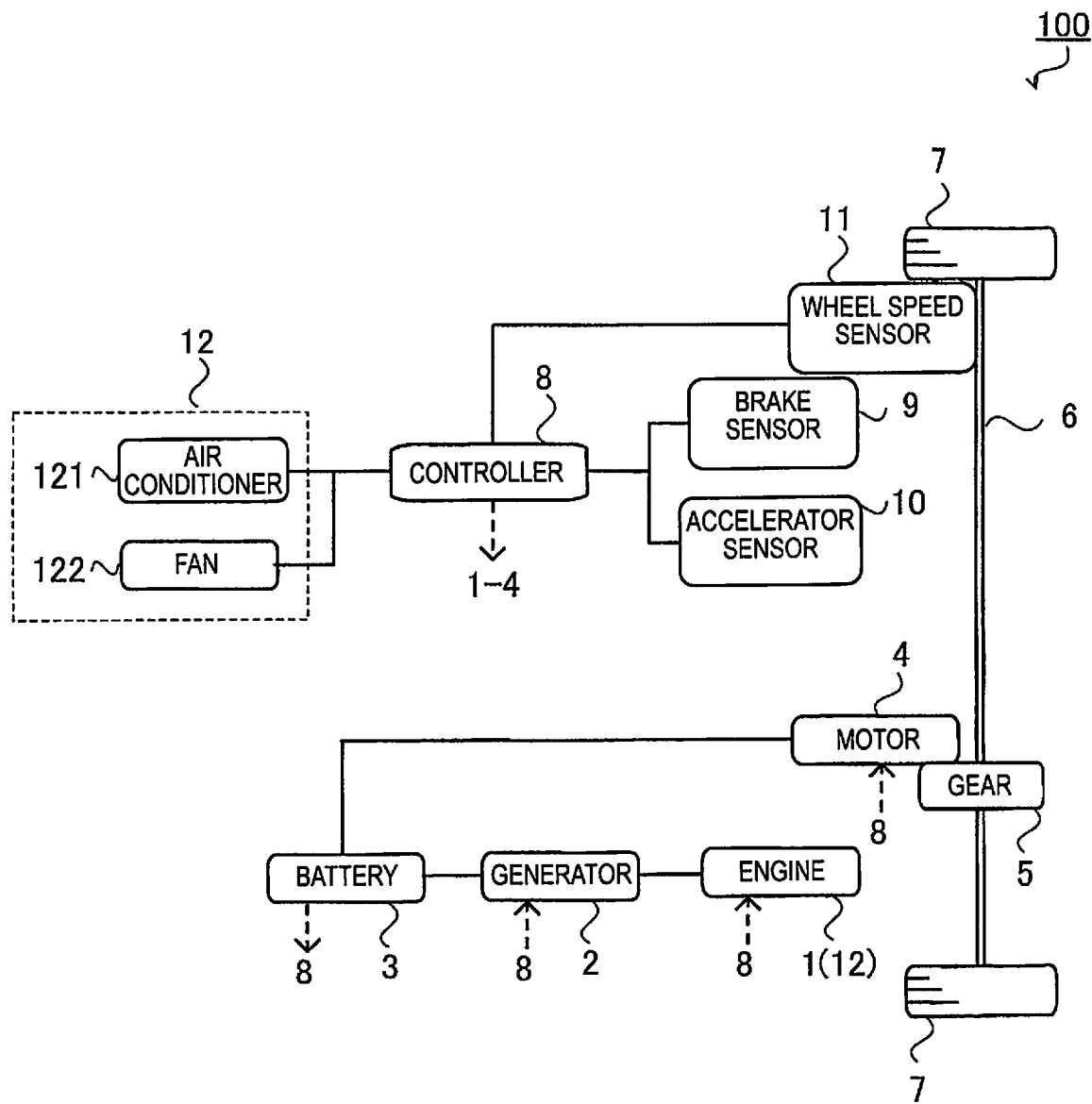
FIG. 1 is a block diagram illustrating the configuration of a vehicle according to a first embodiment.

FIG. 1 is a block diagram illustrating the configuration of a vehicle according to the first embodiment of the present invention.

As shown in FIG. 1, a vehicle 100 comprises an engine (internal combustion engine) 1, a generator 2, a battery 3, an electric motor 4, a gear 5, an axle 6, and wheels 7. In addition, the vehicle 100 is a series type hybrid vehicle that uses the power of the engine 1 to generate power with the generator 2, stores the generated power in the battery 3, and rotates the motor 4 with the electrical power stored in the battery 3, thereby driving the wheels 7. Accordingly, the power of the engine 1 is used, not for causing the vehicle 100 to travel, but for causing the generator 2 to generate power.

The engine 1 is mechanically connected to the generator 2 via a speed reducer (not shown), and the generator 2 is connected to the battery 3 so as to be able to send and receive power. In such a configuration, the driving force of the engine 1 is transmitted to the generator 2, the generator 2 generates electrical power by means of the driving force of the engine 1, and the electrical power generated by the generator 2 is used to charge the battery 3. The electrical power of the battery 3 is supplied to the motor 4, and the motor 4 is rotationally driven by means of the electrical power from the battery 3.

The motor 4 is mechanically connected to the axle 6 via the gear 5, and the axle 6 is mechanically connected to the wheels 7. The driving force of the motor 4 is transmitted to the wheels 7 via the gear 5 and the axle 6. The wheels 7 are driven to rotate by means of the driving force from the motor 4, thereby powering the vehicle 100.

The vehicle 100 comprises a controller 8 that controls the entire vehicle 100. The controller 8 is configured to be capable of executing a prescribed program with a microcomputer equipped with a central processing unit (CPU), read-only memory (ROM), random-access memory (RAM), and an input/output interface (I/O interface). The controller 8 may also be composed of a plurality of microcomputers.

In addition, the vehicle 100 further comprises a brake hydraulic pressure sensor 9 that detects the braking force and an accelerator position sensor 10 that detects the accelerator opening degree. The brake hydraulic pressure sensor 9 and the accelerator position sensor 10 are electrically connected to the controller 8, which receives the detection result from each sensor.

The controller 8 generates a torque command value in accordance with the inputs from the brake hydraulic pressure sensor 9 and the accelerator position sensor 10 and drives the motor 4 in accordance with the torque command value. In addition, the controller 8 is configured to be capable of detecting the remaining charge on the battery 3, and is configured to be capable of controlling the engine 1, the generator 2, and the like, in accordance with the remaining charge on the battery 3 (SOC: State of Charge).

Additionally, the vehicle 100 is provided with a wheel speed sensor 11 that measures the rotation speed of the wheels 7 in the vicinity of the wheels 7 on the side of the wheels 7 below the suspension, as well as a sound generation device 12 that generates sound as it is driven. An air conditioner 121 that controls the temperature of the vehicle cabin and in which noise is generated, and a fan 122 in which rotation noise is generated when the fan cools high-current system, are examples of the sound generation device 12 that generates noise as the device is driven. The engine 1 is also an example of the sound generation device 12 in which noise is generated in accordance with the rotary driving thereof.

Then, in addition to controlling the sound generation device 12 based on a prescribed set of conditions, the controller 8 controls the sound generation device 12 so as to change the volume of the generated noise in accordance with the angular velocity (rotation speed) of the wheels 7 input from the wheel speed sensor 11, as described further below. Because it can be determined that noise caused by vehicle travel is loud when the variation in the angular acceleration obtained by differentiating the angular velocity is high, the controller 8 increases the drive level of the sound generation device 12. When such control is carried out, if the sound generation device 12 is a device that generates noise, the driver is less likely to notice the noise generated by the sound generation device 12 because the noise caused by vehicle travel is loud. As a result, it is possible to increase the drive level of the sound generation device 12 without impairing driver comfort. In the case that the sound generation device 12 is a device that generates notification sounds, when noise caused by vehicle travel is loud, the notification sound can appropriately alert the driver, and the like, by increasing the volume of the notification sound generated by the sound generation device 12. An example in which the sound generation device 12 is a device that generates noise will be described below.

Figure 2:
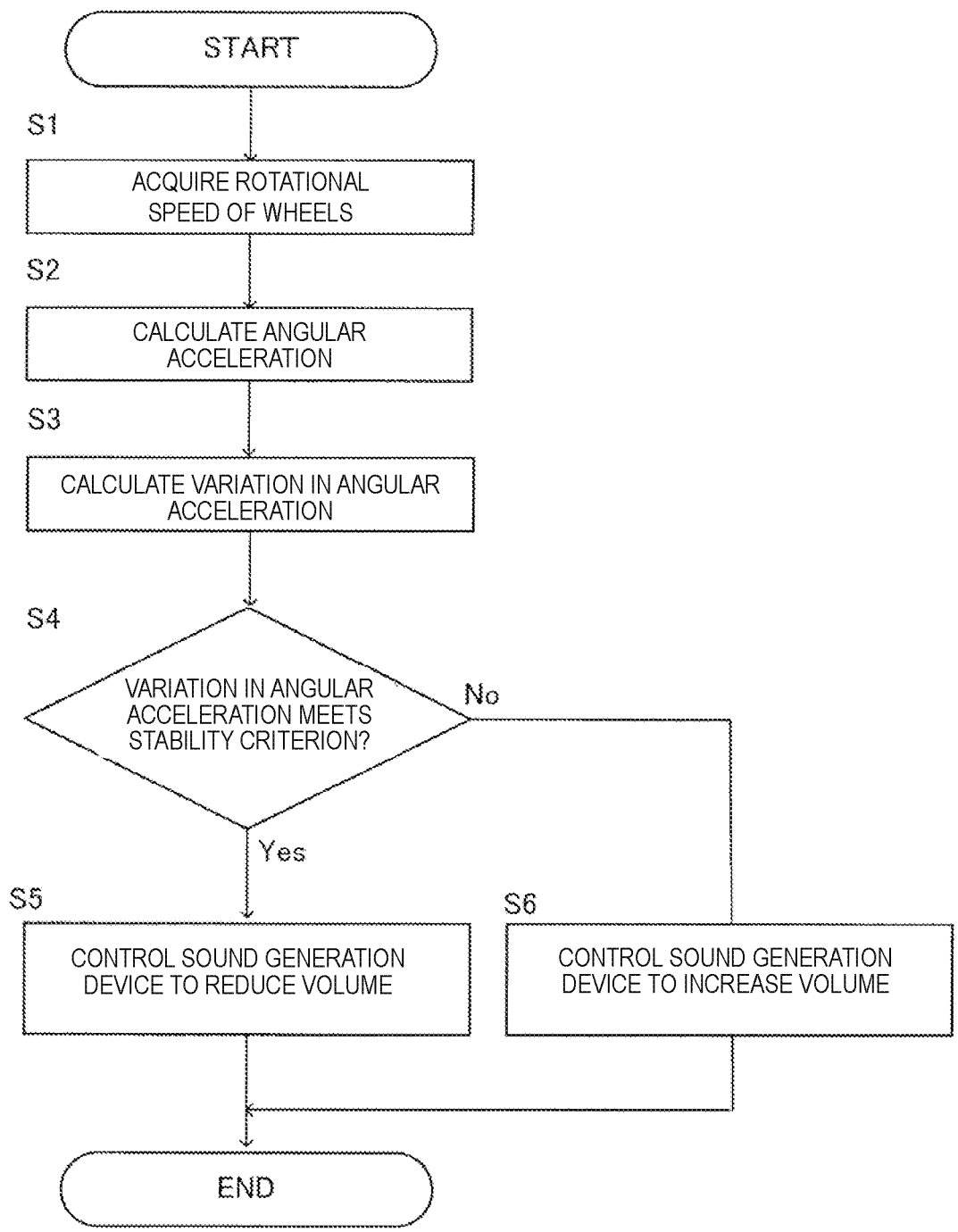
FIG. 2 is a flowchart illustrating the control of a sound generation device.

FIG. 2 is a flowchart illustrating a method for controlling the sound generation device 12 as carried out by the controller 8. The controller 8 controls the sound generation device 12 under a prescribed set of conditions, and additionally controls the sound generation device 12 even when the condition shown in the flowchart shown in FIG. 2 is satisfied.

In Step S1, the controller 8 acquires angular velocity ω of the wheels 7 detected by the wheel speed sensor 11.

In Step S2, the controller 8 differentiates the angular velocity ω of the wheels 7 acquired in Step S1, thereby acquiring angular acceleration A of the wheels 7.

In Step S3, the controller 8 obtains the variation in the angular acceleration A acquired in Step S2. For example, the controller 8 samples the angular acceleration A, and obtains its variance, standard deviation, root-mean-square, the difference between the maximum and minimum values (amplitude) during a prescribed period, the number of times that the angular acceleration entered a prescribed range during a prescribed period, and the like, as the variation corresponding to the fluctuations of the angular acceleration A.

In Step S4, the controller 8 determines whether the variation in the angular acceleration A obtained in Step S3 satisfies a prescribed stability criterion. For example, if the amplitude falls below an amplitude threshold corresponding to the stability criterion, if the variance falls below a variance threshold corresponding to the stability criterion, if the standard deviation falls below a reference deviation, if the root-mean-square falls below a reference value, if the amplitude during a prescribed period falls below a reference value, or if the number of times that the angular acceleration A enters a prescribed range during a prescribed period falls below a reference value, the controller 8 determines that the variation in the angular acceleration A satisfies the prescribed stability criterion.

If it is determined that the variation in the angular acceleration A satisfies the prescribed stability criterion (S4: Yes), the controller 8 carries out the process of Step S5. If it is determined that the variation in the angular acceleration A does not satisfy the prescribed stability criterion (S4: No), the controller 8 carries out the process of Step S6.

In Step S5, because the variation in the angular acceleration A satisfies the prescribed stability criterion, the noise caused by vehicle travel is low and thus the driver is likely to notice the sound generated as the sound generation device 12 is driven. Thus, in order for the sound generated by the sound generation device 12 not to discomfort to the driver, the controller 8 controls the sound generation device 12 so as to decrease the volume of the generated noise. For example, the controller 8 stops the engine 1 or reduces the rotational speed of the air conditioner 121 and the fan 122. This is because, in the first stage of Step S5, the variation in the angular acceleration A satisfies the prescribed stability criterion (S4: Yes), the controller 8 can determine that the sound made by the contact between the wheels 7 and the road surface is relatively low, and that a small amount of noise is caused by travel of the vehicle 100.

In Step S6, because the variation in the angular acceleration A does not satisfy the prescribed stability criterion, the noise caused by vehicle travel is loud, and thus the driver is less likely to notice the sound generated as the sound generation device 12 is driven. Thus, since it is not likely that the sound generated by the sound generation device 12 will cause discomfort to the driver, the controller 8 controls the sound generation device 12 so as to increase the volume of the generated noise. For example, the controller 8 drives the engine 1 to charge the battery 3, increase the drive level of the air conditioner 121, increase the rotational speed of the fan 122, etc. This is because, in the first stage of Step S6, the variation in the angular acceleration A does not satisfy the prescribed stability criterion (S4: No), the controller 8 can determine that the sound made by the contact between the wheels 7 and the road surface is relatively loud, and that a large amount of noise is caused by travel of the vehicle 100.

By means of such control, for example, in the case that the temperature and air volume settings of the air conditioner 121 are set to auto, the controller 8 can raise the drive level of the air conditioner 121 to bring the interior temperature more quickly to the preset temperature. By means of such control, even if the drive level of the air conditioner 121 is high and the generated sound is loud, the driver is not likely to notice the sound, so that it is possible to bring the interior temperature more quickly to the preset temperature without causing discomfort. In this manner, it is possible to shorten the cooling time in the cabin during the summer and to shorten the heating time in the cabin during the winter, in a state in which noise during operation of the air conditioner is made less noticeable.

In addition, in a case in which the fan 122 is used for cooling a high-current system, the controller 8 increases the rotational speed of the fan 122. As a result, during the summer, the cooling time of the battery 3 becomes short so that the output is less likely to be limited, and it becomes possible to prevent deterioration of the high-current system. During the winter, the warm-up time of the battery 3 becomes short so that the output is less likely to be limited, and, because the internal resistance decreases, it becomes possible to improve the operating efficiency.

Figure 3:
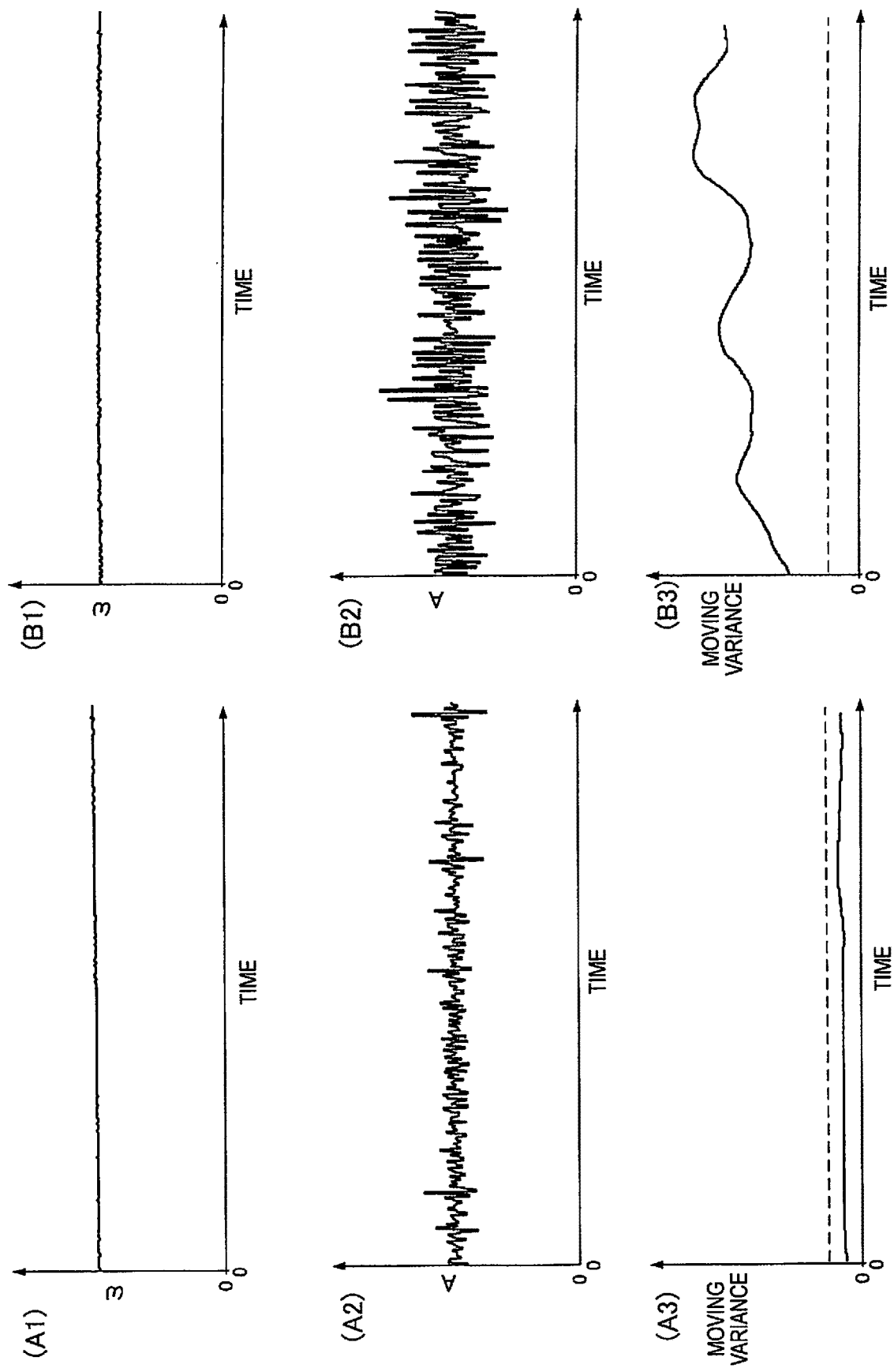
FIG. 3 is a timing chart showing temporal changes in vehicle states.

FIG. 3 is a timing chart showing temporal changes in the states of the vehicle 100, such as the angular acceleration A and the angular velocity ω of the wheels 7, as well as the moving variance of the angular acceleration A. In FIG. 3, an example is shown in which the state of the road surface on which the vehicle 100 travels is good (FIG. 3 (A1)-(A3)), and an example in which the state of the road surface is poor is shown on the right side of the figure (FIG. 3 (B1)-(B3)). In addition, from the top to the bottom of the figure, (A1, B1) show the angular velocity ω, (A2, B2) show the angular acceleration A, and (A3, B3) show the moving variance of the angular acceleration A.

As shown in FIG. 3 (A1) and FIG. 3 (B1), it is difficult to distinguish the difference in the amount of change in the angular velocity ω on both rough and good roads. However, as shown in FIG. 3 (A2) and FIG. 3 (B2), with respect to the angular acceleration A obtained by differentiating the angular velocity ω, in the case of rough roads, there are uneven portions of the road surface on which the vehicle travels, and the angular velocity ω of the wheels 7 increases and decreases as the wheels 7 pass over the convex portions thereof. However, as shown in FIG. 3 (A1) and FIG. 3 (B1), the amount of change in the angular velocity ω is small on both rough and good roads, so that it is difficult to distinguish the difference between the two. Thus, as shown in FIG. 3 (A3) and FIG. 3 (B3), the controller 8 obtains the moving variance of the angular acceleration A. Because the moving variance exceeds the variance threshold corresponding to the stability criterion, it can be determined that the noise in the vehicle 100 caused by vehicle travel is loud.

In addition, an example in which the controller 8 controls the rotational speed (air volume) of the fan 122 and the air conditioner 121 was described as the above-described embodiment, but the invention is not limited thereto. The controller 8 may change the rotational speed of the engine 1 during idling. For example, if it is determined that the variation in the angular acceleration A satisfies the prescribed stability criterion (S4: Yes), the controller 8 determines that the noise caused by vehicle travel is low and reduces the rotational speed of the engine 1 during sailing idling, in which the vehicle enters an idling state during travel. On the other hand, if it is determined that the variation in the angular acceleration A does not satisfy the prescribed stability criterion (S4: No), the controller 8 determines that the noise caused by vehicle travel is loud and increases the rotational speed of the engine 1 during sailing idling. By the above-described configuration, it is possible to suppress the amount of fuel consumption without causing discomfort due to engine noise during sailing idling, when noise caused by vehicle travel is loud.

In general, the lower the rotational speed of the engine 1 during idling, the lower will be the fuel consumption, but noise generated due to resonance with the vehicle body increases. Thus, when the noise in the vehicle 100 caused by vehicle travel is loud, even if the rotational speed of the engine 1 during idling is reduced, the noise caused by idling becomes less noticeable to the driver, so that it is possible to improve fuel consumption without causing discomfort.

There are cases in which a torque converter, which is a fluid coupling, is provided at a connecting portion between the engine 1 and the generator 2. When the rotational speed of the engine 1 rises to a prescribed speed, the engine 1 and the generator 2 are locked up, and the engine 1 transmits torque to the generator 2. In general, in order to efficiently transmit the driving force of the engine 1, entering a lock-up state in a state in which the rotational speed of the engine 1 is lower is preferable. However, if the lockup state is entered in a state in which the rotational speed of the engine 1 is low, torque fluctuations of the engine 1 are transmitted without being absorbed, thereby increasing the vibration and noise that are generated in the vehicle 100. However, when the noise caused by the engine 1 is relatively large, even if it enters the lockup state in a state in which the rotational speed of the engine 1 is lower, noise caused by the lockup is not easily noticeable to the driver.

Thus, if it is determined that the variation in the angular acceleration A satisfies the prescribed stability criterion (S4: Yes), the controller 8 brings about the lockup state in a state in which the rotational speed of the engine 1 is relatively high. On the other hand, if it is determined that the variation in the angular acceleration A does not satisfy the prescribed stability criterion (S4: No), the controller 8 brings about the lockup state in a state in which the rotational speed of the engine 1 is relatively low.

In addition, the controller 8 may change the torque output of the engine 1 at the time of warm-up, when the engine 1 is driven. For example, if it is determined that the variation in the angular acceleration A satisfies the prescribed stability criterion (S4: Yes), the controller 8 reduces the torque of the engine 1 at the time of warm-up. On the other hand, if it is determined that the variation in the angular acceleration A does not satisfy the prescribed stability criterion (S4: No), the controller 8 increases the torque of the engine 1 at the time of warm-up.

By means of the first embodiment, the following effects can be achieved.

A large portion of the noise that is generated in the vehicle 100 during travel is caused by the sound made by the contact between the wheels 7 and the road surface. That is, when there is little change in the speed of the vehicle 100, there is a small amount of noise made by the contact between the wheels 7 and the road surface so that the overall noise is low. On the other hand, when the speed of the vehicle 100 changes, the sound made by the contact between the wheels 7 and the road surface becomes louder.

According to the method for controlling the vehicle 100 of the first embodiment, if it is determined that the variation in the angular acceleration A satisfies the prescribed stability criterion (S4: Yes), the controller 8 determines that the noise caused by travel of the vehicle 100 is low, and controls the sound generation device 12 such that the volume of the generated sound becomes low (S5). On the other hand, if it is determined that the variation in the rotational speed does not satisfy the prescribed stability criterion (S4: No), the controller 8 determines that there is a large amount of noise caused by vehicle travel and controls the sound generation device 12 such that the volume becomes high (S6).

In this manner, when the sound generated in the vehicle 100 caused by travel is relatively loud, if the sound generated by the sound generation device 12 is increased, it becomes difficult for a person in the vehicle cabin to notice, and thus hear, the sound generated by the sound generation device 12. As a result, it is possible to suppress a deterioration on occupant comfort and to operate the sound generation device 12 with a high load, thereby improving the driving performance of the vehicle 100. When there is little noise caused by vehicle travel, the sound generation device 12 is controlled such that the noise caused by the sound generation device 12 is low, so that it is possible to maintain quiet within the vehicle cabin. In this manner, it is possible to improve comfort inside the vehicle cabin.

In addition, in contrast to a case in which a sensor is provided on the vehicle body side with respect to a suspension provided between the wheels 7 and the vehicle body, the state of the wheels 7, which are the source of road noise, is directly observed by means of the wheel speed sensor 11, and the presence/absence of noise generation is determined based on the observation result. In this manner, because it is possible to directly observe the state of the wheels 7, rather than the suspension, or the like, in the case of the wheels 7 passing over a road with undulations, it becomes easy to detect the state of the wheels 7 that pass over the undulations, and it is thereby possible to determine the presence/absence of generation of noise that is generated due to contact between the wheels 7 and the road surface.

According to the method for controlling the vehicle 100 of the first embodiment, the amplitude of the angular acceleration A can be used as a parameter indicating the variation in the angular acceleration A. In the case that the amplitude of the angular acceleration A is smaller than an amplitude threshold indicating a prescribed stability criterion (S4: Yes), the controller 8 determines that the noise caused by vehicle travel is low, and controls the sound generation device 12 such that the volume of the generated sound becomes low (S5). On the other hand, in the case that the amplitude of the angular acceleration A is larger than the threshold (S4: No), the controller 8 determines that there is a large amount of noise caused by vehicle travel, and controls the sound generation device 12 such that the volume of the generated sound becomes high (S6). By the above-described configuration, because the sound generation device 12 can be controlled in accordance with the magnitude of the noise generated in the vehicle 100 caused by travel, it is possible increase the drive level of the sound generation device 12 while suppressing a deterioration in occupant comfort within the vehicle cabin.

According to the method for controlling the vehicle 100 of the first embodiment, the variance in the angular acceleration A can be used as a parameter indicating the variation in the angular acceleration A. In addition to a case in which the sound generation device 12 is controlled in accordance with prescribed conditions, in the case that the variance of the angular acceleration A is smaller than a threshold indicating a prescribed stability criterion (S4: Yes), the controller 8 determines that the noise caused by vehicle travel is low, and controls the sound generation device 12 such that the volume of the generated sound becomes low (S5). On the other hand, in the case that the variance of the angular acceleration A is larger than the threshold (S4: No), the controller 8 determines that the noise caused by vehicle travel is high, and controls the sound generation device 12 such that the volume of the generated sound becomes high (S6). By the above-described configuration, because the sound generation device 12 can be controlled in accordance with the magnitude of the noise generated in the vehicle 100 caused by vehicle travel, it is possible increase the drive level of the sound generation device 12 while suppressing a deterioration in occupant comfort within the vehicle cabin. In addition, because use of the variance is a common statistical technique, a general-purpose control method can be used in the controller 8.

Second Embodiment

In the second embodiment, a specific example of control of the engine 1 when the sound generation device 12 is the engine 1 will be described.

Figure 4:
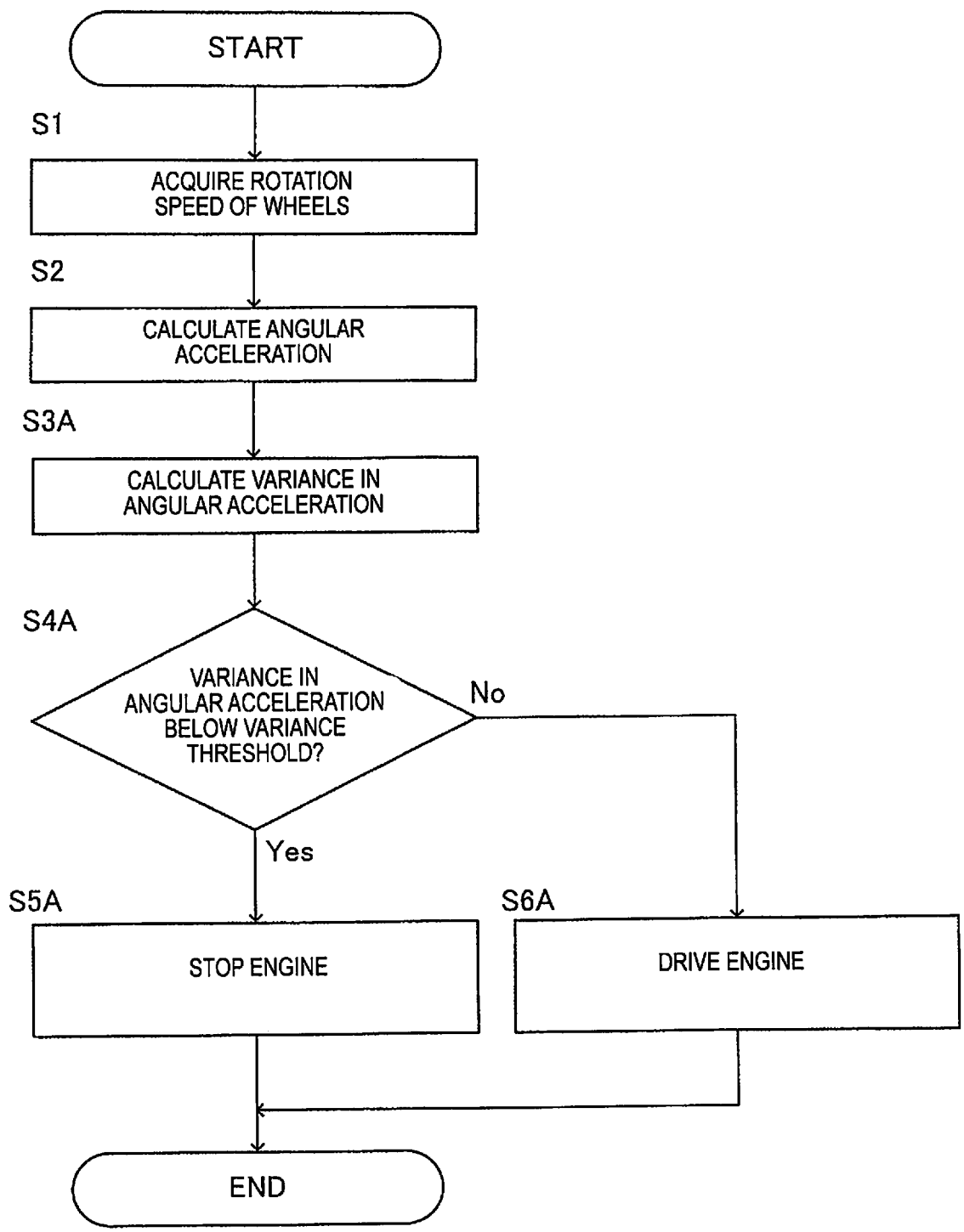
FIG. 4 is a flowchart illustrating the control of an engine according to a second embodiment.

FIG. 4 is a flowchart illustrating control of the engine 1 according to the second embodiment. In this control, compared to the flowchart of the first embodiment shown in FIG. 2, control of Steps S3A, S4A, S5A, and S6A is carried out in place of Steps S3, S4, S5, and S6.

In Step S3A, the controller 8 obtains the variance of the angular acceleration A obtained in Step S2.

In Step S4A, the controller 8 determines whether the variance obtained in Step S3A is smaller than a variance threshold corresponding to the stability criterion. Then, if the variance obtained in Step S3A is smaller than the variance threshold (S4A: Yes), the controller 8 determines that the noise caused by vehicle travel is low and proceeds to the process of Step S5A. If the variance is not smaller than the variance threshold, the controller 8 determines that there is a large amount of noise caused by vehicle travel (S4B: Yes) and proceeds to the process of Step S6A.

In Step S5A, the controller 8 stops the engine 1. By means of this control, the sound of the engine 1 will not be heard.

In Step S6A, the controller 8 drives the engine 1 to charge the battery 3 with the electrical power generated by the generator 2. Engine sound is generated by the driving of the engine 1.

In this control, if little noise is caused by vehicle travel, the engine 1 is not driven so that no engine sound is generated, and it is thus possible to maintain quiet inside the vehicle cabin. On the other hand, if the noise caused by vehicle travel is high, the engine 1 can be driven to charge the battery 3, but the vehicle travel sound is loud and the driver is less likely to notice the engine sound, so that even if charging by means of the engine 1 is carried out, the battery 3 can be charged without causing discomfort.

By means of the second embodiment, the following effects can be achieved.

According to the method for controlling the vehicle 100 of the second embodiment, if the variance of the angular acceleration A falls below the variance threshold (S4A: Yes), the controller 8 determines that the noise caused by vehicle travel is low, and stops the engine 1 (S5A). On the other hand, if the variance of the angular acceleration A exceeds the variance threshold (S4A: No), the controller 8 determines that there is a large amount of noise caused by vehicle travel and drives the engine 1 (S6A).

By the above-described configuration, when there is a relatively large amount of noise caused by vehicle travel, the engine 1 is driven and the battery 3 is charged. As a result, because it becomes difficult for the driver of the vehicle 100 to hear the sound of the engine 1 due to the noise caused by travel of the vehicle 100, it is possible to extend the travelable distance of the vehicle 100 while maintaining the comfort of the driver of the vehicle 100. On the other hand, when there is relatively little noise caused by vehicle travel, the engine 1 is stopped. As a result, because the sound of the engine 1 stops, it is possible to maintain quiet within the cabin of the vehicle 100. In this manner, it is possible to improve the comfort of the driver of the vehicle 100.

Third Embodiment

In the third embodiment, another example of a control of the engine 1 when the sound generation device 12 is the engine 1 will be described.

Figure 5:
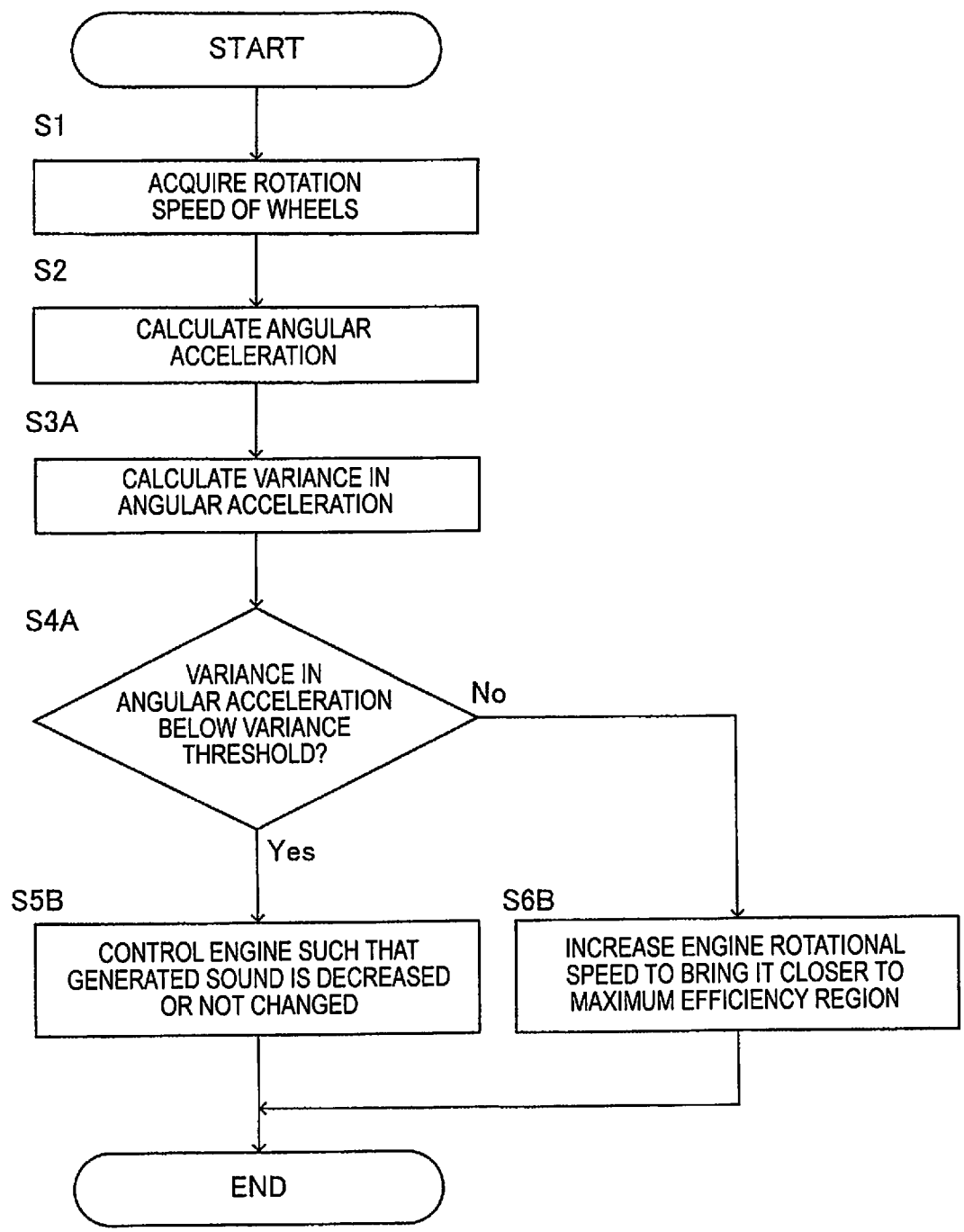
FIG. 5 is a flowchart illustrating the control of an engine according to a third embodiment.

FIG. 5 is a flowchart illustrating control of the engine 1 according to the third embodiment. In this control, compared to the flowchart of the second embodiment shown in FIG. 4, control of Step S5B is carried out in place of Step S5A, and control of Step S6B is carried out in place of Step S6A.

In Step S5B, the controller 8 controls the engine 1 to decrease the rotational speed so that the generated engine sound becomes smaller, or, to not change the driving state of the engine 1. As a result, when a control is carried out so as to reduce the engine sound, the electrical power generated by the generator 2 is reduced and the engine sound of the engine 1 decreases. In addition, if the driving state of the engine 1 is not changed, the engine sound does not change.

In Step S6B, the controller 8 controls the engine 1 such that the rotational speed increases. As a result, the electrical power generated by the generator 2 is increased and the engine sound of the engine 1 increases. In this control of the engine 1, the controller 8 increases the rotational speed so as to improve the operating efficiency of the engine 1.

Figure 6:
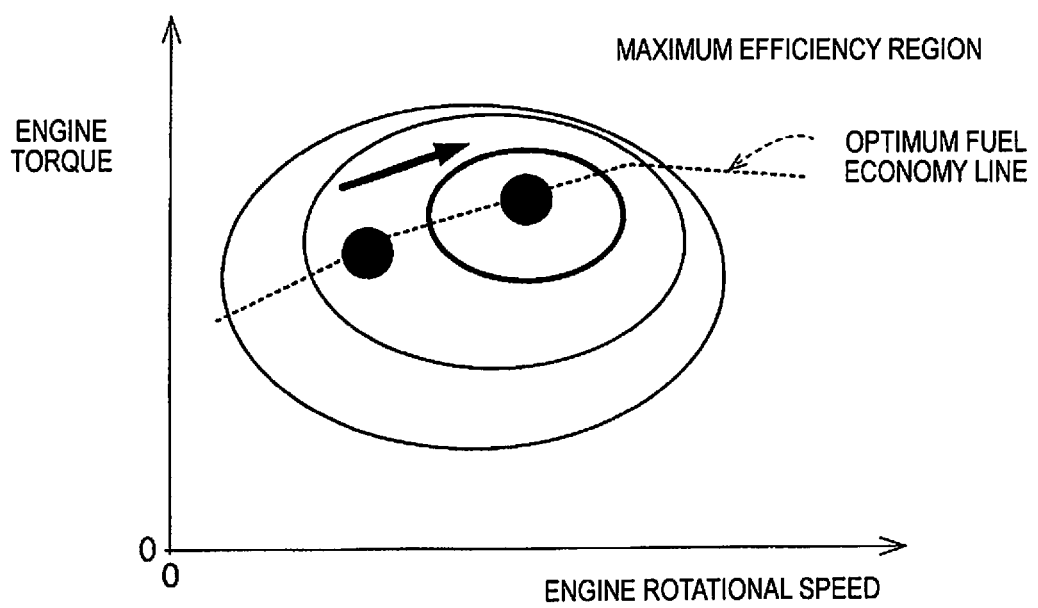
FIG. 6 is a diagram illustrating the operating regions of an engine.

FIG. 6 is a diagram illustrating operation regions corresponding to the operating point of the engine 1. This figure is used in the above-described process of Step S6B.

In this figure, the x axis represents the rotational speed of the engine 1 and the y axis represents the engine torque. The operating points at which the operating efficiency of the engine 1 are equal are indicated by an ellipse, and the operating efficiency becomes the highest level when the operating point is inside the ellipse indicted by the thick line. In addition, the dotted line indicates where the operation points at which the fuel consumption becomes lowest as the optimum fuel economy line.

Here, in Step S6B, the controller 8 changes the torque and rotational speed of the engine 1 so as to pass through the optimum fuel economy line shown in FIG. 6. At the same time, if the operating point of the engine 1 is in a maximum efficiency region, the controller 8 carries out a control so as not to change the rotational speed of the engine 1. However, when the SOC of the battery 3 is small, or the like, the engine 1 may be controlled at a higher rotational speed exceeding the maximum efficiency region. By the above-described configuration, the rotational speed of the engine 1 can be controlled by taking into consideration fuel consumption and efficiency.

Figure 7:
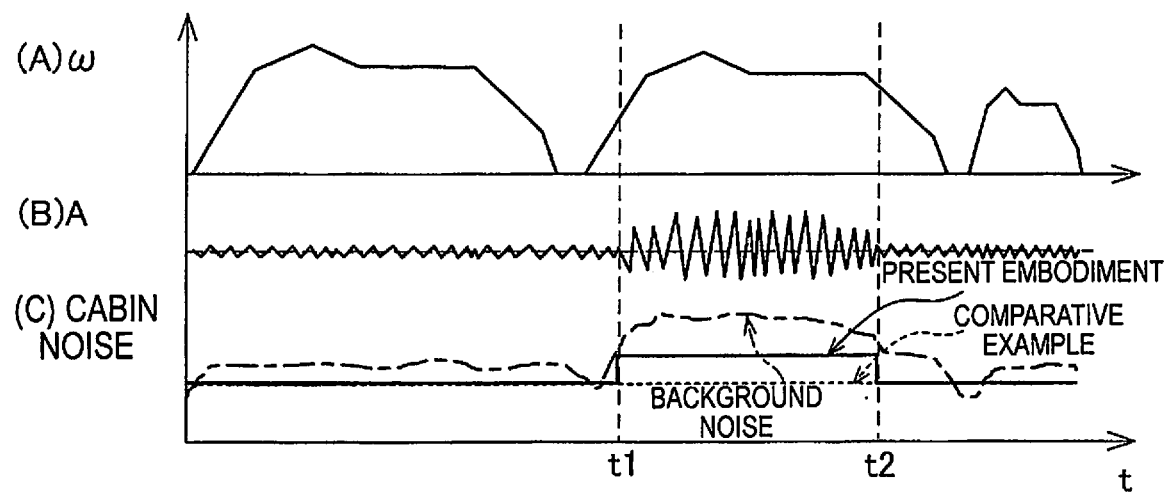
FIG. 7 is a timing chart illustrating the operating states of an engine.

FIG. 7 is a time timing chart showing the state of the engine 1 in the present embodiment; in this figure, (A) the angular velocity ω, (B) the angular acceleration A, and (C) the volume inside the cabin of the vehicle 100 are shown in order from the top. At the bottom, noise caused by traveling (background sound) is indicated by the dashed-dotted line. In addition, the engine sound of the engine 1 in the case that the control of the present embodiment is carried out is indicated by the solid line, and in the case of a comparative example in which the rotational speed of the engine 1 is not changed is indicated by the dotted line.

As shown at the top, (A) the angular velocity ω changes in accordance with an accelerator or braking operation. Then, it is assumed that the variation in (B) the angular acceleration A does not satisfy the stability criterion in time $t_1$-$t_2$. In such a case, as shown in (C) cabin sound, the engine sound changes over time. In contrast, in the comparative example in which the vehicle 100 is running stably and the angular velocity ω and the angular acceleration A are constant, the engine sound essentially does not change over the entire time.

Because the background sound shown in (C) cabin sound is noise caused by traveling, it changes in accordance with the angular velocity ω and the angular acceleration A. At time t1-t2, the engine sound is smaller than the background sound in the comparative example, it is not very audible for the driver, thereby maintaining comfort. In contrast, in the present embodiment, because the engine sound is lower than the background sound, so that the engine sound is similarly not very audible for the driver, and comfort can be maintained. In this manner, in the present embodiment, it is possible to increase the driving opportunities of the engine 1, thereby increasing the charging amount of the battery 3, while maintaining a similar comfort as in the comparative example.

By means of the third embodiment, the following effects can be achieved.

According to the method for controlling the vehicle 100 of the third embodiment, if the variance of the angular acceleration A is smaller than the variance threshold (S4A: Yes), the controller 8 determines that the noise caused by vehicle travel is low, and reduces the rotational speed of the engine 1 (S5B). On the other hand, if the variance of the angular acceleration A is not smaller than the variance threshold (S4A: No), the controller 8 determines that the noise caused by vehicle travel is high, and increases the rotational speed of the engine 1 (S6B). When increasing the rotational speed of the engine 1, the controller 8 carries out a control to optimize the operating efficiency of the engine 1.

By the above-described configuration, when the noise caused by traveling is relatively small, the rotational speed of the engine 1 is low and the engine sound is small, so that the battery 3 can be somewhat charged while maintaining comfort. When the noise caused by traveling is relatively large, the engine sound not easily heard even if the drive level of the engine 1 is increased, so that comfort can be maintained, and the rotational speed of the engine 1 is increased, thereby increasing the amount of charge of the battery 3. In addition, when the rotational speed of the engine 1 is increased, a control is carried out to optimize the operating efficiency of the engine 1, and it is thereby possible to improve fuel efficiency.

Fourth Embodiment

In the fourth embodiment, an example of controlling the engine 1 in two stages when the sound generation device 12 is the engine 1 will be described. This control is carried out in a first stage for controlling driving/stopping of the engine 1, and a second stage for controlling high/low of the rotational speed of the engine 1.

Figure 8:
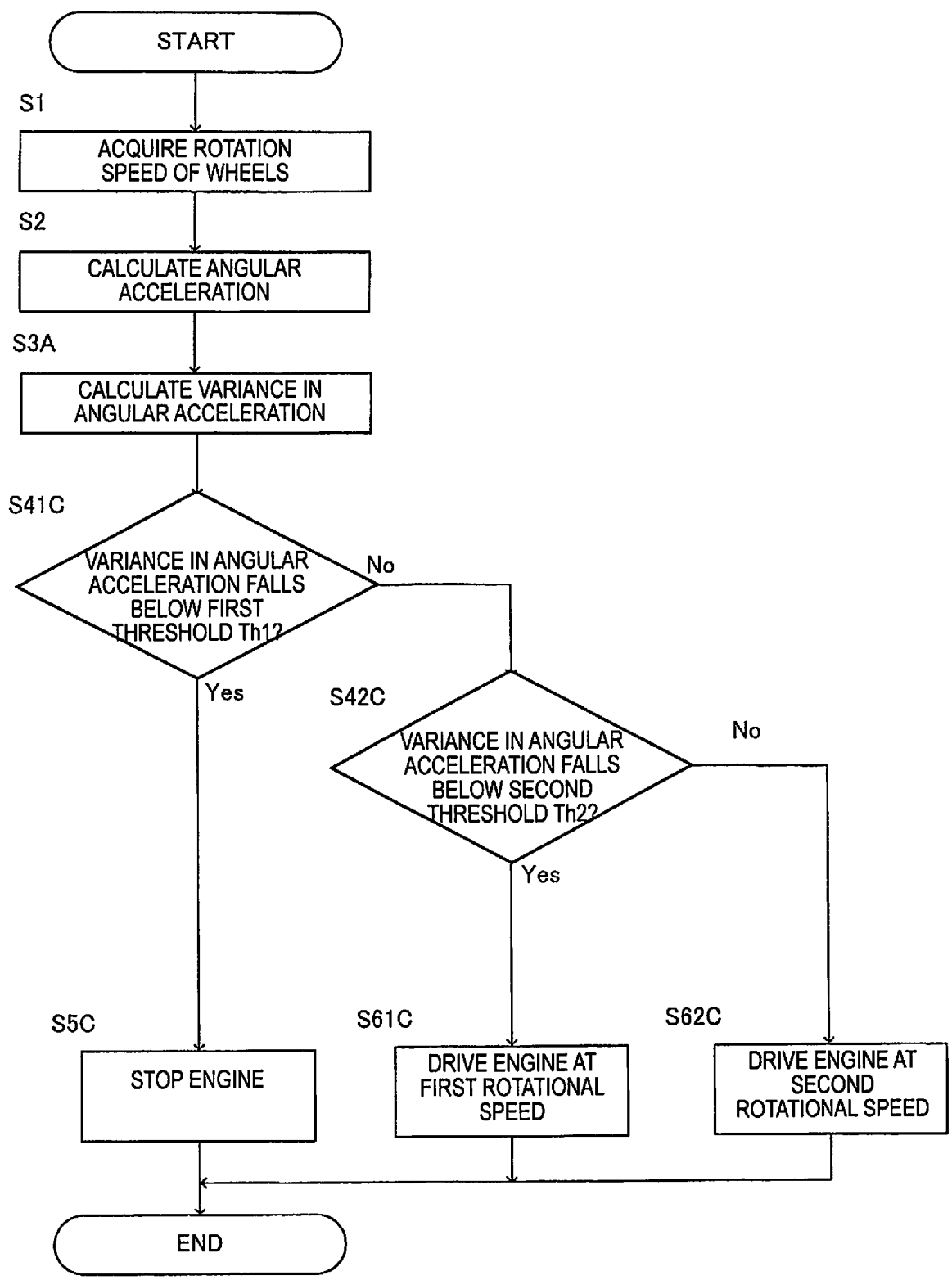
FIG. 8 is a flowchart illustrating the control of an engine according to a fourth embodiment.

FIG. 8 is a diagram illustrating control of the engine 1 in the according to the fourth embodiment. In this control, control of Steps S41C, S42C is carried out in place of Step S4, control of Step S5C is carried out in place of Step S5, and control of Steps S61C, S62C is carried out in place of Step S6.

In Step S41C, the controller 8 determines whether the variance of the angular acceleration A of the engine 1 falls below a first threshold. Here, the first threshold is a threshold for determining the control of the first stage for controlling driving/stopping of the engine 1. If the variance of the angular acceleration A falls below the first threshold (S41C: Yes), the controller 8 carries out the process of Step S5C. If the variance of the angular acceleration A does not fall below the first threshold (S41C: No), the controller 8 carries out the process of Step S42C.

In Step S42C, the controller 8 determines whether the variance of the angular acceleration A falls below a second threshold, which is greater than the first threshold. Here, the second threshold is a threshold for determining control of the second stage for controlling high/low of the rotational speed of the engine 1. If the variance of the angular acceleration A falls below the second threshold (S42C: Yes), the controller 8 carries out the process of Step S61C. If the variance of the angular acceleration A does not fall below the second threshold (S42C: No), the controller 8 carries out the process of Step S62C.

In Step S5C, the controller 8 stops the engine 1. As a result, the sound of the engine 1 stops.

In Step S61C, the controller 8 drives the engine 1 at a first rotational speed. As a result, the sound of the engine 1 is generated.

In Step S62C, the controller 8 drives the engine 1 at a second rotational speed, which is higher than the first rotational speed. As a result, an engine sound that is louder than that of Step S61C is generated by the engine 1.

Figure 9:
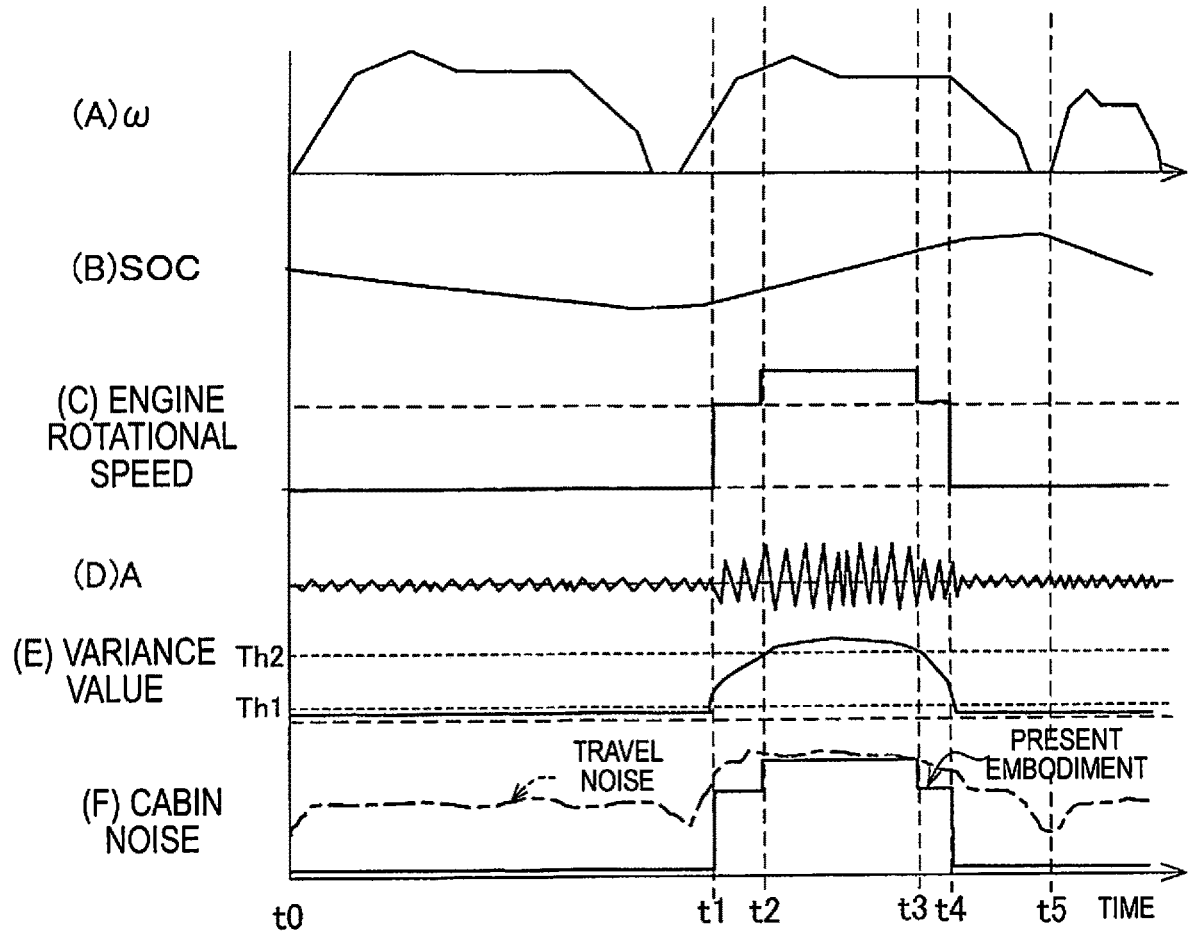
FIG. 9 is a time chart illustrating the operating states of an engine.

FIG. 9 is a time chart illustrating changes in the states of the vehicle 100 in the present embodiment. In the figure, from the top down, (A) shows the angular velocity ω, (B) the SOC of the battery 3, (C) the rotational speed of the engine 1, (D) the angular acceleration A, (E) the variance value of the angular acceleration A, and (F) the noise inside the vehicle cabin. In regard to the noise inside the vehicle cabin shown at (F), the travel sound corresponding to the rotational speed of the engine 1 is indicated by the dashed-dotted line.

From time t0 to t1, (A) the angular velocity ω changes and (B) the SOC changes in accordance with the operating control. When (A) the angular velocity ω is decreasing, regenerative braking of the motor 4 is carried out, so that the battery 3 is charged. Thus, immediately before time t1, (B) the SOC increases. Further, in this section, the vehicle 100 is traveling over a relatively good road surface and (D) the angular acceleration A is not changing significantly, so that (E) the variance value falls below a first threshold Th1. Thus, the engine 1 is not being driven, and (C) the engine rotational speed becomes 0.

At time t1, when the vehicle 100 starts to travel over a relatively rough road surface and the (E) variance value exceeds the first threshold Th1, the engine 1 is rotated at the first rotational speed so that the (C) engine rotational speed is increased to a first level. Then, because the generator 2 starts power generation by means of the driving of the engine 1, the (B) SOC starts to increase.

At time t2, when the road surface becomes rougher and the (E) variance value exceeds a second threshold Th2, the rotational speed of the engine 1 is increased, and when it is rotated at a second rotational speed, which is higher than the first rotational speed, the (C) engine rotational speed further increases to a second level. In such a state, because the power generation amount increases, (B) the SOC continues to increase.

At time t3, when the road surface becomes relatively smooth and (E) the variance value falls below the second threshold Th2, the rotational speed of the engine 1 is decreased, and when it is rotated at the first rotational speed, the (C) engine rotational speed drops to the first level. In this state, the power generation amount decreases but (B) the SOC continues to increase.

At time t4, when the road surface becomes smoother and (E) the variance value falls below the first threshold Th1, the engine 1 is stopped so that (C) the engine rotational speed becomes zero. In this state, the power generation of the generator 2 stops but (A) the angular velocity ω is decreasing and regenerative braking of the motor 4 is being carried out, so that (B) the SOC continues to increase.

Then, after (A) the angular velocity ω becomes zero, at time t5, the vehicle 100 accelerates, and when (A) the angular velocity ω becomes large, (B) the SOC starts to decrease.

When such a control is carried out, referring to the changes in (F) the cabin sound, noise caused by vehicle travel (travel sound) generally changes in accordance with (E) the variance value. Then, in the present embodiment, the rotational speed of the engine 1 is controlled in two stages in accordance with the magnitude of (E) the variance value, thereby making the engine sound lower than the travel sound at all time periods.

The comparative example will be described next. In the comparative example, it is assumed that the controller 8 carries out the control shown in FIG. 10.

Figure 10:
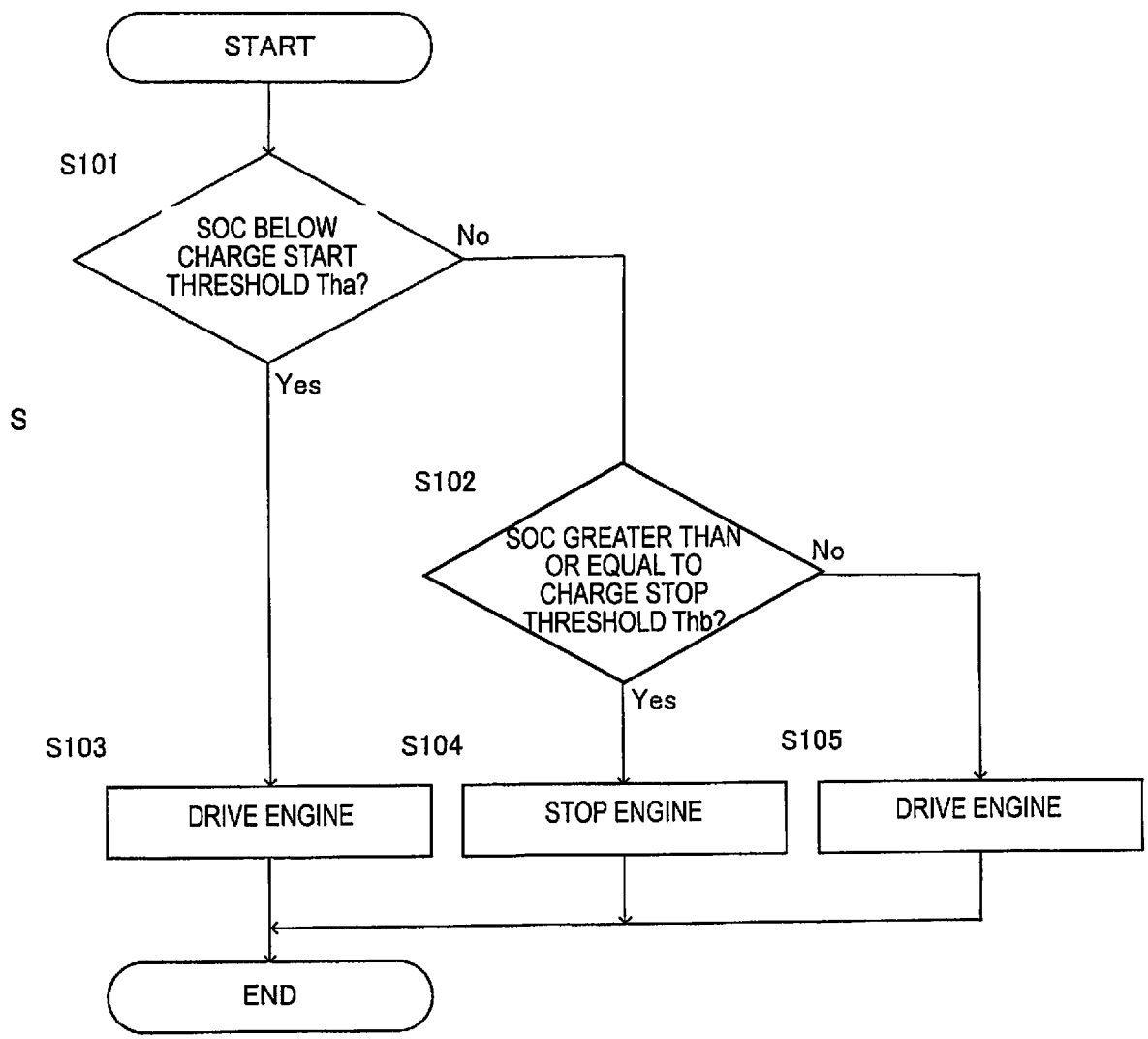
FIG. 10 is a flowchart illustrating the control of an engine according to a comparative example.

FIG. 10 is a flowchart illustrating control of the engine 1 according to the comparative example. In the comparative example, the controller 8 controls the engine 1 in accordance with the SOC of the battery 3.

In Step S101, the controller 8 determines whether the SOC of the battery 3 is smaller than a charge start threshold, which is a reference for starting charging.

If the SOC is smaller than the charge start threshold (S101: Yes), the controller 8 then proceeds to Step S103. On the other hand, if the SOC is not smaller than the charge start threshold (S101: No), the controller 8 then proceeds to Step S102.

In Step S102, the controller 8 determines whether the SOC is greater than or equal to a charge stop threshold, which is a reference for stopping charging.

If the SOC is greater than or equal to the charge stop threshold (S102: Yes), the controller 8 then proceeds to Step S103. On the other hand, if the SOC is smaller than the charge stop threshold (S102: No), the controller 8 then proceeds to Step S105.

In Steps S103 and S105, the controller 8 drives the engine 1. The generator 2 is thereby operated and the battery 3 is charged.

In Step S104, the controller 8 stops the engine 1. The charging of the battery 3 is thereby stopped.

Figure 11:
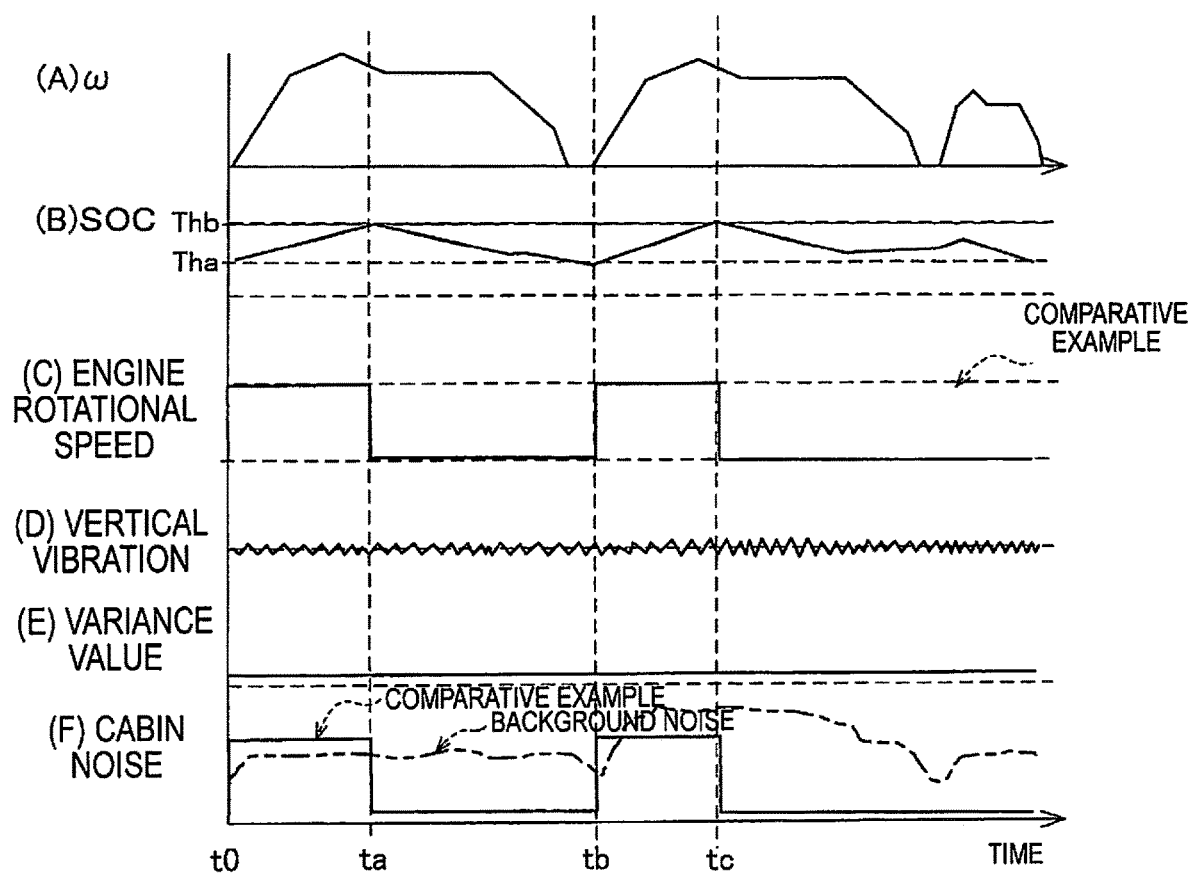
FIG. 11 is a time chart illustrating the operating states of an engine according to a comparative example.

FIG. 11 is a time chart illustrating states of the vehicle 100 according to the comparative example. In this figure, as in FIG. 9, from the top down, (A) shows the angular velocity ω, (B) the SOC of the battery 3, (C) the rotational speed of the engine 1, (D) the vertical vibration, (E) the variance of the angular acceleration A, and (F) the noise inside the vehicle cabin. In regard to the noise inside the vehicle cabin shown at (F), the travel sound corresponding to the rotational speed is indicated by the dashed-dotted line.

In the comparative example, (D) the vertical vibration is acquired by an acceleration sensor attached to the vehicle body. Because there is a suspension system between the wheels 7 and the vehicle body, the acceleration sensor cannot directly observe the vertical vibration of the wheels 7, and (D) the vertical vibration does not change significantly at all times.

At time t0, because the engine 1 is being driven, (C) the engine rotational speed becomes a prescribed level and (B) the SOC increases.

When (B) the SOC reaches the charge stop threshold Thb at time ta, the engine 1 stops, so that (C) the rotational speed of the engine 1 becomes zero. As a result, (B) the SOC starts to decrease.

When (B) the SOC becomes smaller than the charge start threshold Tha at time tb, the engine 1 starts to be driven, so that (C) the rotational speed of the engine 1 becomes the first level. (B) the SOC thereby starts to increase thereafter.

When (B) the SOC reaches the charge stop threshold Thb again at time tc, the engine 1 stops, so that (C) the rotational speed of the engine 1 becomes zero. (B) the SOC thereby decreases thereafter.

When such control is carried out, in regard to (F) the cabin sound, there is no correlation between the noise caused by vehicle travel (travel sound) and the engine sound that is generated in the vehicle cabin as the engine 1 is driven. As a result, because the engine sound exceeds the travel sound during some time periods, a person in the vehicle cabin may consider the engine sound to be unpleasant.

On the other hand, in the fourth embodiment, two threshold value to be compared with the angular acceleration A are provided in order to carry out switching of the rotational speed of the engine 1 in two stages, thereby making it possible to further bring the magnitude of the engine sound closer to that of the travel sound. As a result, it is possible to increase the driving opportunities of the engine 1, so that the amount of charge of the battery 3 can be increased.

Fifth Embodiment

In the fifth embodiment, an example in which the controller 8 changes the threshold value used for determining stopping/driving of the engine 1 will be described. In the present embodiment, when the SOC is relatively high and the need to charge is low, driving the engine 1 is made difficult, and when the SOC is relatively low and the need to charge is high, driving the engine 1 is made easier.

Figure 12:
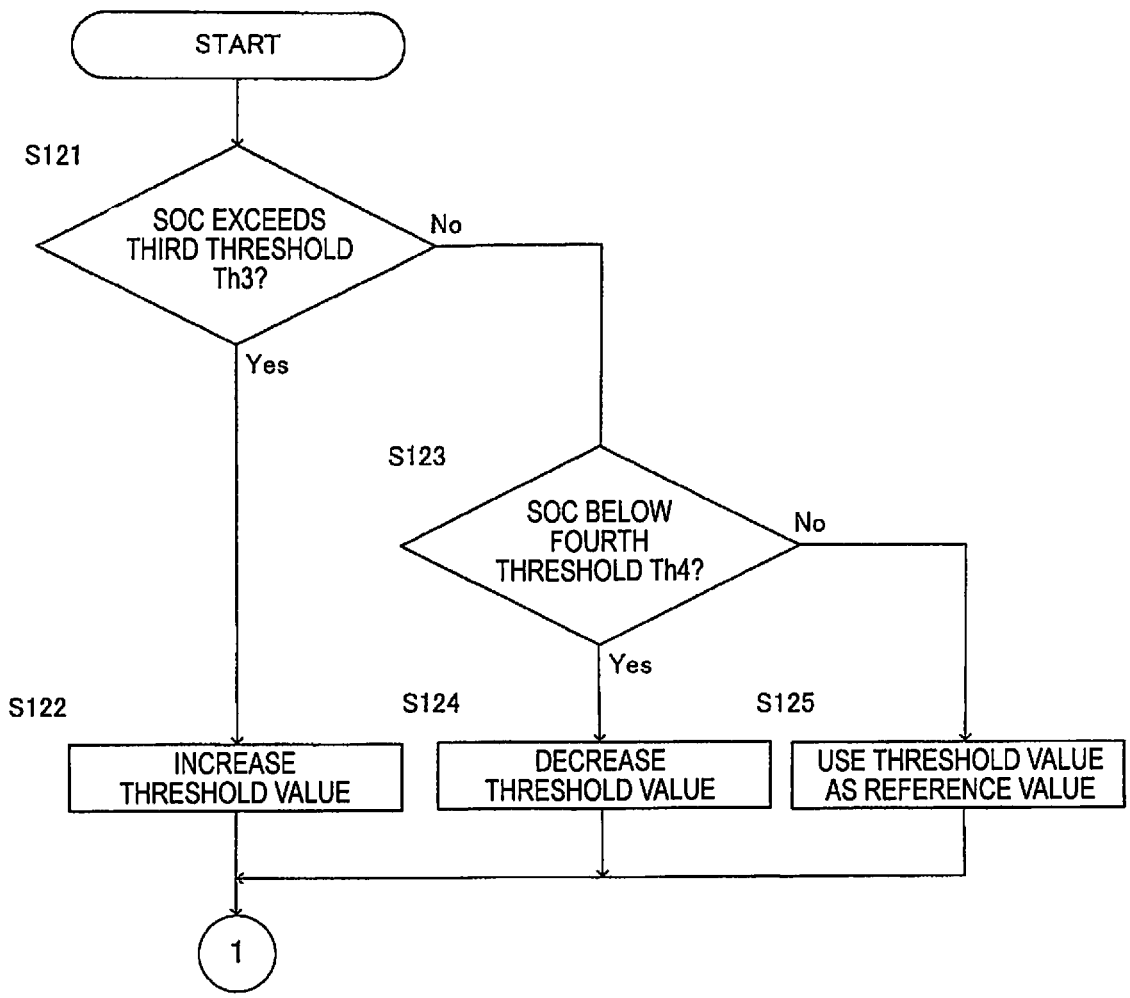
FIG. 12 is a flowchart illustrating part of the control of an engine according to a fifth embodiment.
Figure 13:
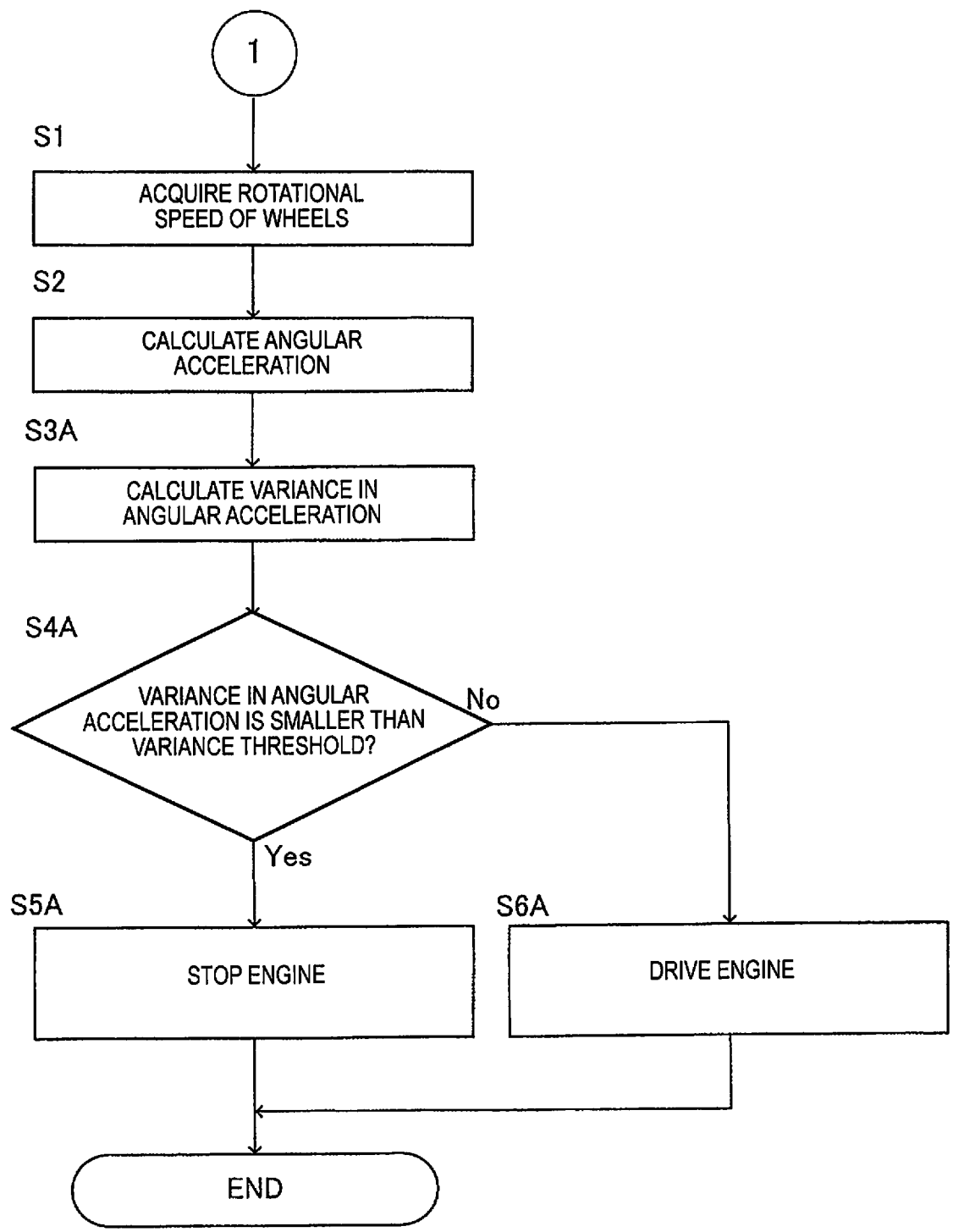
FIG. 13 is a flowchart illustrating part of the control of an engine.

In the fifth embodiment, it is assumed that the engine 1 is controlled as shown in FIGS. 12 and 13. The flowchart shown in the latter FIG. 13 is the same as the flowchart of the second embodiment shown in FIG. 4.

In the flowchart shown in the former FIG. 12, a variance threshold corresponding to the stability criterion used for the determination of Step S4A is determined in accordance with the SOC of the battery 3.

Figure 14:
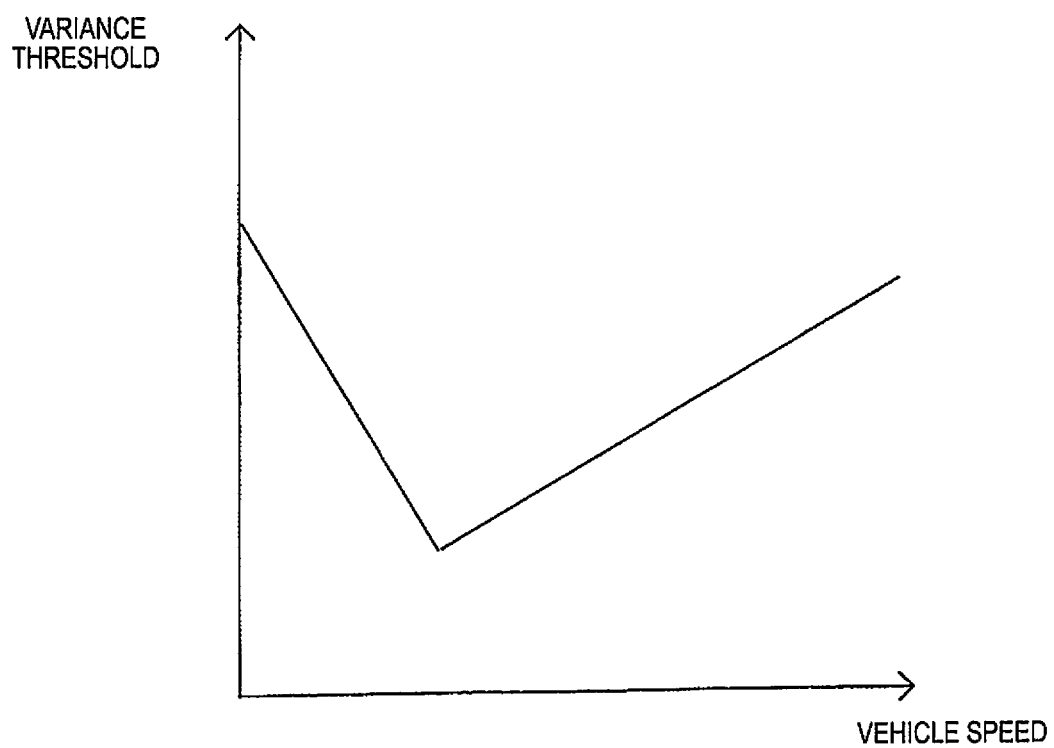
FIG. 14 is a graph showing the relationship between vehicle speed and a variance threshold.

Here, FIG. 14 shows the variance threshold corresponding to the stability criterion. As shown in this figure, the variance threshold is determined in accordance with the vehicle speed. In this example, the variance threshold is composed of a low-speed region and a high-speed region. In the low-speed region, the variance threshold decreases as the vehicle speed increases. In the high-speed region, the variance threshold increases as the vehicle speed increases.

In the high-speed region, because the noise generated in the vehicle 100 increases as the vehicle speed increases, the variance threshold is increased as the vehicle speed increases. In the low-speed region, if the vehicle speed is low, noise caused by vehicle travel tends to be significantly reduced, the variance threshold is increased as the vehicle speed decreases.

Referring to FIG. 12 again, in Step S121, the controller 8 determines whether the SOC is greater than a third threshold Th3. The third threshold Th3 is a value at which it can be determined that the SOC of the battery 3 is sufficiently high and the need to charge is low. If the SOC is higher than the third threshold Th3 (S121: Yes), the controller 8 determines that the need to charge the battery 3 is low and carries out the process of Step S122. If the SOC is not higher than the third threshold Th3 (S121: No), the controller 8 carries out the process of Step S123.

Figure 15:
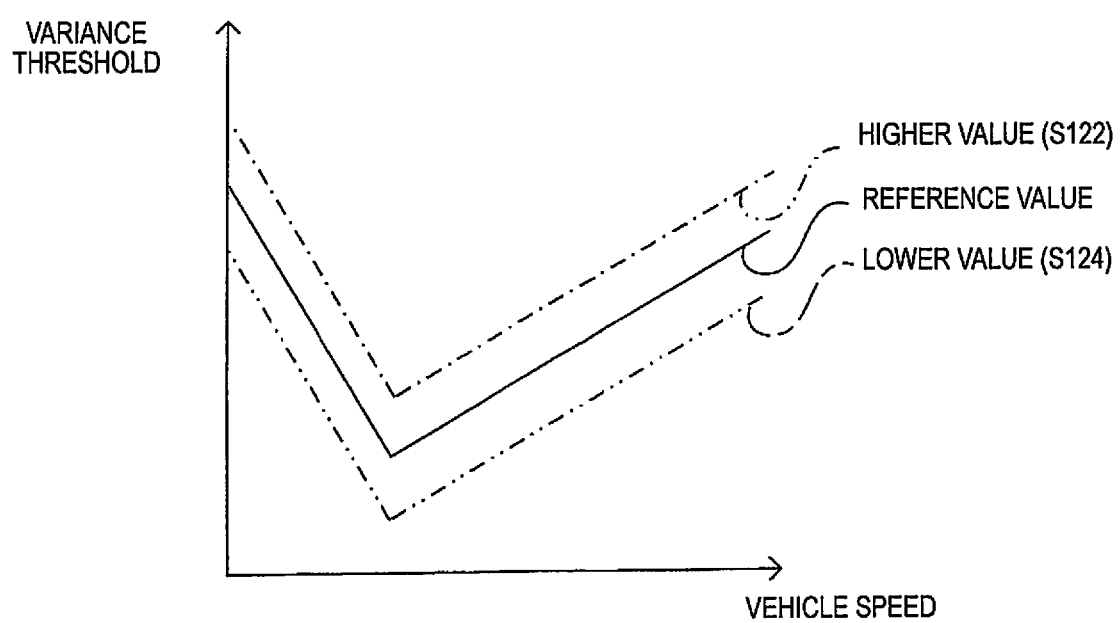
FIG. 15 is a graph showing the correction of the variance threshold.

In Step S122, as shown in FIG. 15 the controller 8 adds an offset value to the variance threshold, thereby changing the variance threshold to a higher value. If the SOC exceeds an appropriate upper limit value (S121: Yes), because the SOC is high and the need to charge the battery 3 is low, a correction to increase the threshold is carried out. Therefore, the variance tends to become smaller than the variance threshold in the process of the subsequent Step S4A (S4A: Yes) the engine 1 stops more easily (S5A), so that an increase in the SOC is suppressed.

In Step S123, the controller 8 determines whether the SOC is below a fourth threshold Th4. The fourth threshold Th4 is a value at which it can be determined that the SOC of the battery 3 is relatively low and that the need to charge is high. Then, if the SOC is below the fourth threshold Th4 (S122: Yes), the controller 8 determines that the need to charge the battery 3 is high and carries out the process of the subsequent Step S124. If the SOC does not exceed the fourth threshold Th4 (S122: No), the controller 8 carries out the process of Step S125.

In Step S124, as shown in FIG. 15, the controller 8 subtracts an offset value from the variance threshold, thereby changing the variance threshold to a smaller value. If the SOC is below an appropriate lower limit value (S123: Yes), because the SOC is low and the need to charge the battery 3 is high, a correction to reduce the threshold is carried out in this manner. As a result, the variance is less likely to become smaller than the variance threshold in the process of Step S4A (S4A: No) and the engine 1 is more easily driven (S6A), so that an increase in the SOC is promoted.

In Step S124, the controller 8 uses the reference value shown in FIG. 15 as the threshold value, thereby not correcting the variance threshold. By means of such a control, since the need to charge differs depending on the remaining charge on the battery 3, the engine 1 can be more appropriately driven and stopped.

In the present embodiment, the variance threshold is changed in accordance with the SOC of the battery 3, but the invention is not limited thereto. For example, if the time during which the variance falls below the variance threshold is long, the driver may experience discomfort if the engine 1 is not driven for a long period of time, so that the variance threshold may be reduced to make the engine 1 more easily driven. On the other hand, if the variance frequently exceeds the variance threshold, the driver may experience discomfort if the engine 1 is driven frequently, so that the variance threshold may be increased to make driving the engine 1 more difficult.

By this configuration, it is possible to prevent a deterioration in fuel economy due to the engine 1, which is the noise source, continuing to consume energy, and, in a case in which the engine 1 remains inactive, it is possible to suppress a lack of warm-up or energy for travel in the battery 3. Thus, repercussions on other aspects of performance can be prevented. It is also possible to suppress the occurrence of discomfort to the driver.

By the fifth embodiment, the following effects can be achieved.

According to the fifth embodiment, if the SOC of the battery 3 exceeds the third threshold Th3, indicating that the amount of charge is sufficient (S121: Yes), because the need to charge the battery 3 is low, the controller 8 increases the variance threshold to raise the criterion for stability (S122). By the above-described configuration, the engine 1 can be easily stopped, so that the fuel economy can be improved. On the other hand, if the charge on the battery 3 is below the fourth threshold Th4, indicating that the SOC is relatively low (S124: Yes), because the need to charge the battery 3 is high, the controller 8 decreases the variance threshold to relax the criterion for stability (S122). By the above-described configuration, the engine 1 can be easily driven, so that the battery 3 can be prevented from becoming empty.

Sixth Embodiment

In the fifth embodiment, the variance threshold is changed in accordance with the SOC of the battery 3, but the invention is not limited thereto. For example, the variance threshold may be changed in accordance with the vehicle speed and the amount of operation of the steering wheel. For this reason, a sensor is provided on the steering wheel, and the controller 8 receives input of the operation amount from said sensor.

Figure 16:
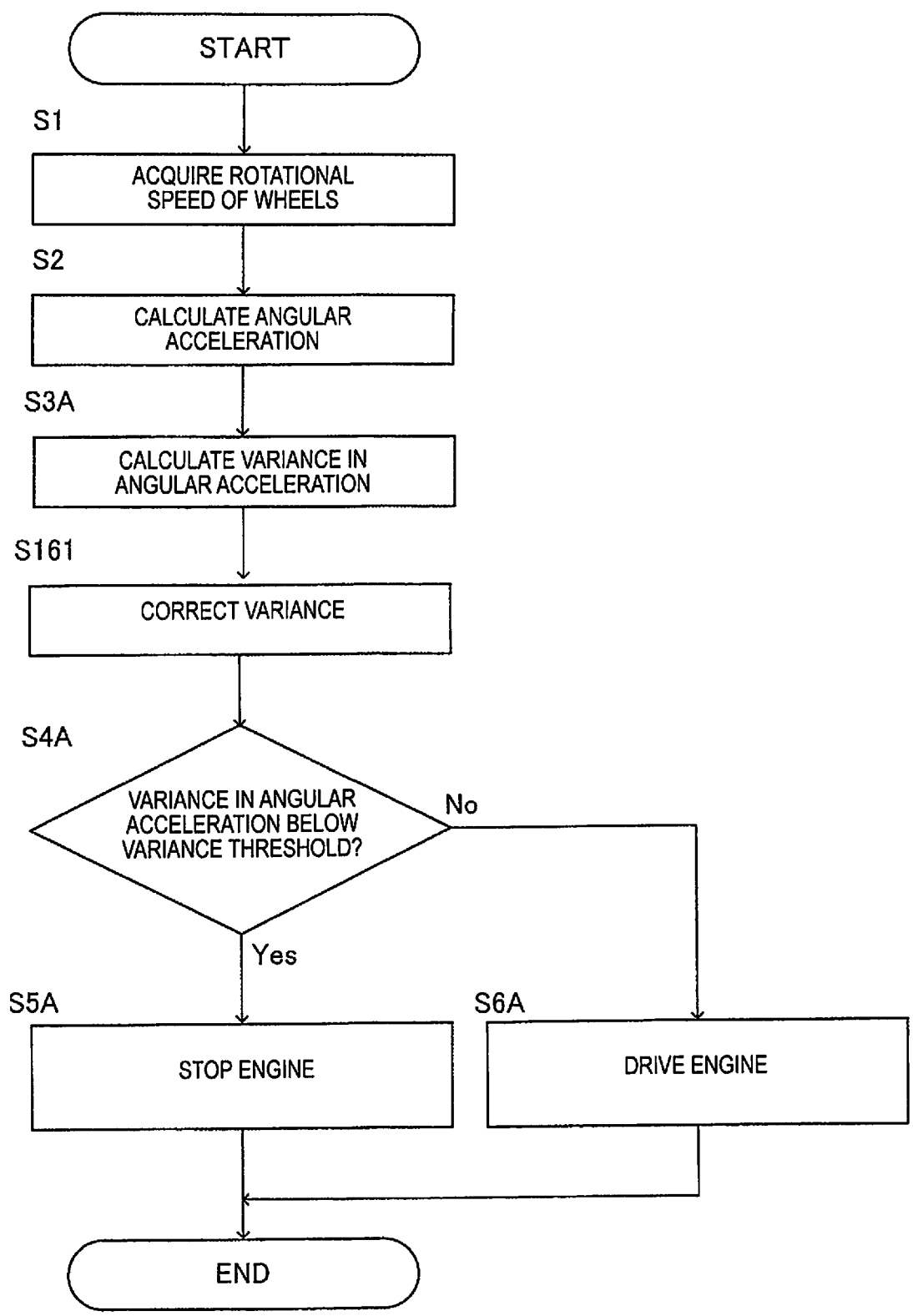
FIG. 16 is a flowchart illustrating the control of an engine according to a sixth embodiment.

FIG. 16 is a flowchart illustrating control of the engine 1 according to the sixth embodiment. As shown in this figure, the basic flowchart is the same as the flowchart of the second embodiment shown in FIG. 4, but differs in that the process of Step S161 is carried out between Steps S3A and S4A.

In Step S161, the controller 8, referencing the table shown in FIG. 16, sets a correction coefficient in accordance with the vehicle speed as well as the speed and angle of the steering wheel and multiplies the variance calculated in Step S3A by the correction coefficient, thereby correcting the variance threshold.

FIG. 17 is a table showing correction coefficients used for the correction in Step S161. In this figure, the correction coefficients corresponding to the steering angle (θ) and the steering speed (6/θ) are shown for each of the vehicle speeds of 20 km/h, 40 km/h, and 60 km/h. As shown in these graphs, when the steering angle is zero, or when the steering speed (6/θ) is zero, the correction coefficient is 1. This indicates that correction is not necessary when the steering wheel is being operated. Then, the correction coefficient decreases as the steering angle increases and the turning radius decreases, or, as the steering speed increases and the wheel operating speed increases. That is, if the steering wheel is being operated, compared to a case in which the steering wheel is not being operated, the wheels 7 will slip a small amount, so that the variance of the angular acceleration A of the wheels 7 tends to become large when the wheels 7 pass over a convexity on an uneven road surface. Thus, if the steering wheel is being operated, the angular acceleration A can be multiplied by a correction coefficient less than 1, and thereby appropriately control the engine sound generated from the engine 1 in accordance with the noise caused by travel.

In addition, in these tables, the correction coefficient decreases as the vehicle speed increases. That is, regardless of presence/absence of a steering operation, the variance of the angular acceleration A of the wheels 7 is more likely to become large when the wheels 7 pass over a convex portion as the travel speed increases, so that the angular acceleration A may be reduced to make it easy for the engine 1 to be driven.

Because it is possible to appropriately take into consideration the noise caused by travel by the above-described configuration, it is possible to appropriately control the driving of the engine 1, and thereby increase the SOC of the battery 3 while maintaining driver comfort. In the present embodiment, the variance threshold is multiplied by the correction coefficient, but the variance value of the angular acceleration A may be multiplied by the correction coefficient. In that case, unlike in the present embodiment, the correction coefficient becomes greater than 1.

By the sixth embodiment, the following effects can be achieved.

According to the sixth embodiment, the noise generated in accordance with the angular acceleration A changes in accordance with the operation of the steering wheel. The noise increases as the steering angle increases and the turning radius decreases, or, as the steering speed increases and the wheel operating speed increases. Thus, it is possible to correct the variance value in accordance with the amount or speed of the operation of the steering wheel, and thereby adjust the ease of driving the engine 1 and more appropriately control the sound generation device 12.

Modified Example

The controller 8 may use parameters other than the steering wheel and the vehicle speed to correct the threshold value. For example, parameters that affect the noise caused by travel, such as the air pressure, type, or deterioration degree of the tires, the external temperature, the state of the road surface, or the vehicle weight may be used to correct the threshold value. By the above-described configuration, it is possible to control the volume of the sound generated by a sound generation device, such as the engine 1, more appropriately in accordance with the noise caused by travel.

Seventh Embodiment

In the first to the sixth embodiments, control relating to devices in which noise is generated, such as the engine 1, the air conditioner 121, the fan 122, or the like, as the sound generation device 12 was described, but the invention is not limited thereto. The sound generation device 12 may generate a notification sound to the driver.

Figure 18:
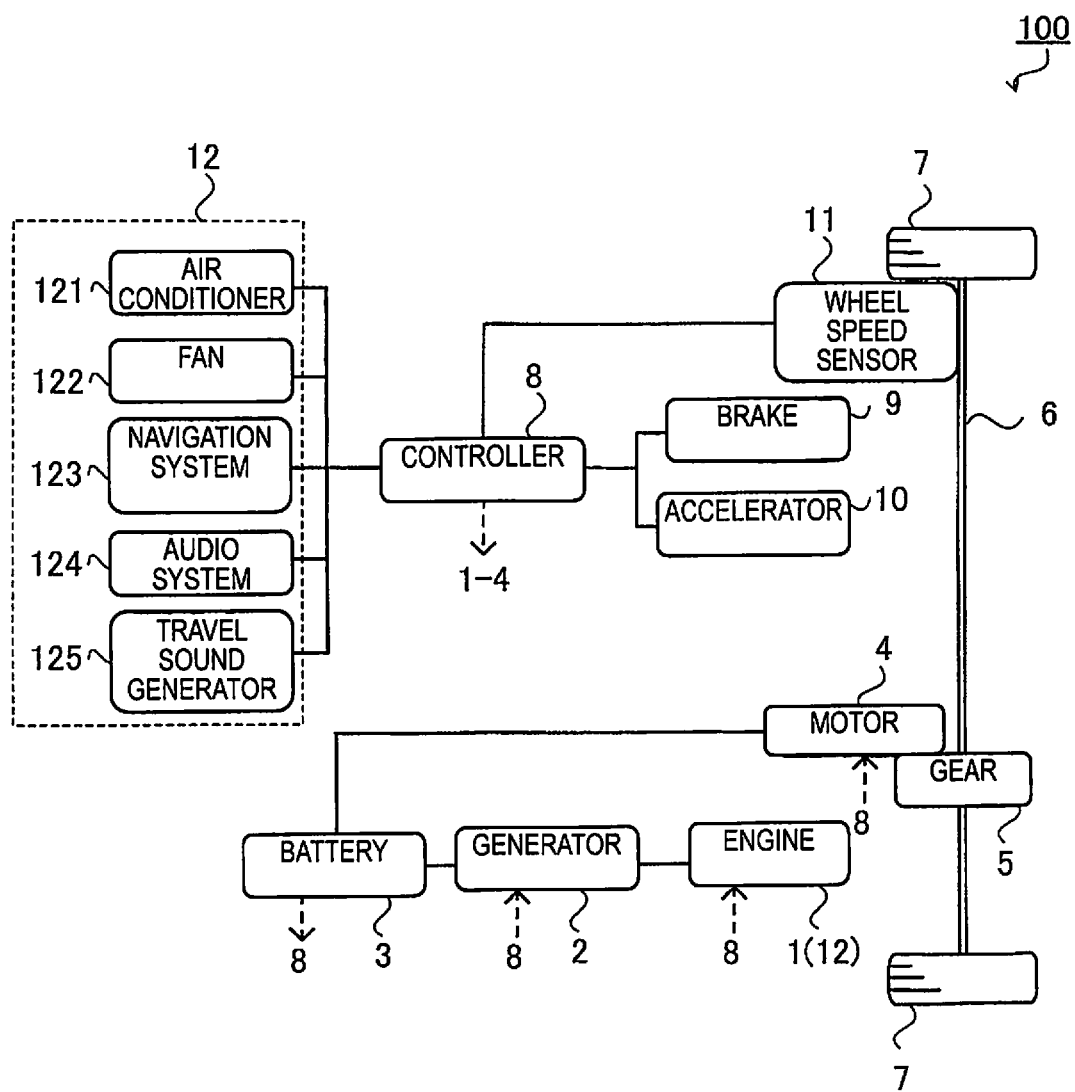
FIG. 18 is a block diagram illustrating the configuration of a vehicle according to a seventh embodiment.

FIG. 18 is a schematic overview of the seventh embodiment.

According to the figure, the sound generation device 12 further includes a navigation system 123, an audio system 124, and a travel sound generator 125. The navigation system 123 notifies the driver of travel route guidance. The audio system 124 plays music, etc., selected by the driver. The travel sound generator 125 is a device that intentionally plays a sound that simulates the driving sound of the engine 1 in order to notify people around the vehicle 100 that the vehicle is running, and is specifically used in the vehicle 100 that is driven by the motor 4, as in the present embodiment.

Even in the sound generation device 12 that generates such a notification sound, by carrying out the control of the first embodiment shown in FIG. 2, when the variation in the angular acceleration A is small, the stability criterion is met (S4: Yes), and the noise caused by vehicle travel is low, the sound generation device 12 is controlled such that the notification sound is at low volume (S5). On the other hand, if the variation in the angular acceleration A is large, the stability criterion is not met (S4: No), and the noise caused by vehicle travel is high, the sound generation device 12 is controlled such that the notification sound becomes loud (S6). If the variation in the angular acceleration A is large, the stability criterion is not met (S4: No), and the noise caused by vehicle travel is high, the sound generation device 12 is controlled such that the notification sound of the sound generation device 12 becomes louder than said noise.

By the seventh embodiment, the following effects can be achieved.

According to the seventh embodiment, control is carried out such that the required notification sound to the people around the vehicle 100 or the driver becomes loud (S6) if the noise is loud (S4: No), and the required notification sound to the people around the vehicle 100 or the driver is at low volume (S5) if the noise is at low volume (S4: Yes). By means of the above-described control, it is possible to transmit the notification sound to the driver inside the vehicle cabin or to pedestrians in the vicinity of the vehicle 100 at an appropriate volume relative to the volume of the noise caused by travel.

For example, if the sound generated by the sound generation device 12 is controlled in accordance with sound collected by a microphone in order to control the volume inside the vehicle cabin, when loud conversations are taking place inside the cabin, the volume of the notification sound becomes loud each time a conversation takes place. Thus, by determining the volume of the noise caused by travel in accordance with the variation in the angular acceleration A, it is possible to change the volume of the notification sound in accordance with mainly the effect of road noise, so that the notification sound can be controlled to a volume more appropriate for the people inside the vehicle cabin.

Eighth Embodiment

In the first to the seventh embodiments, the volume of the sound generated by the sound generation device 12 is controlled in accordance with the variation in the angular acceleration A, but the invention is not limited thereto. In addition, in the sixth embodiment, the correction coefficient is changed in accordance with the vehicle speed, as shown in FIG. 17. In the present embodiment, the volume of the sound generated by the sound generation device 12 may be controlled by means of another method in accordance with the vehicle speed (angular velocity ω).

Figure 19:
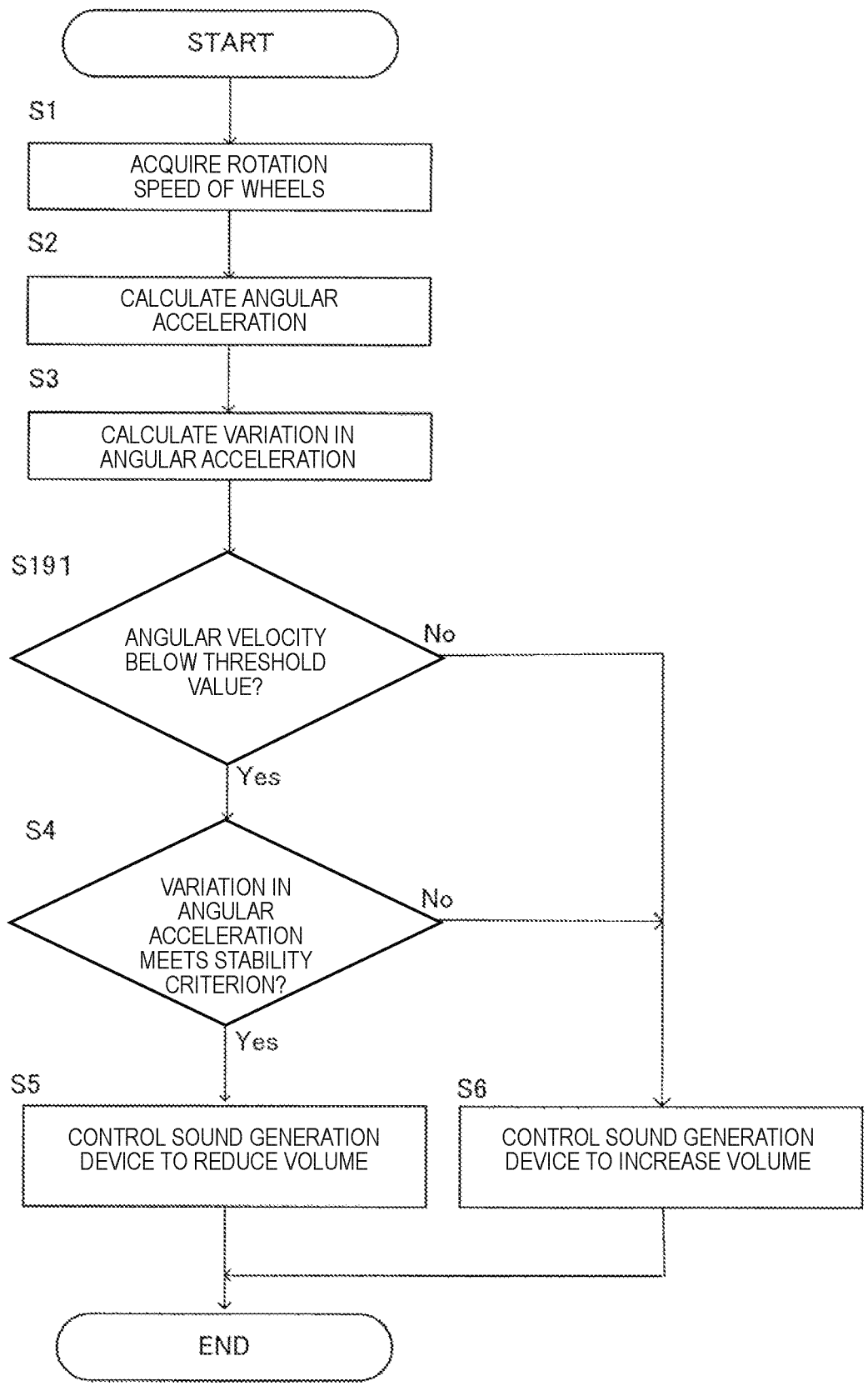
FIG. 19 is a flowchart illustrating the control of an engine according to an eighth embodiment.

FIG. 19 is a flowchart illustrating control of the sound generation device 12 according to the present embodiment. In this control, compared to the flowchart of the first embodiment shown in FIG. 2, the determination of Step S191 is carried out between the processes of Steps S3 and S4.

In Step S191, the controller 8 determines whether the angular velocity ω indicating the rotation speed of the wheels 7 obtained in Step S2 is below a prescribed threshold value. Here, the angular velocity ω is a parameter for determining the speed of the vehicle 100, and the vehicle speed is highly correlated with wind noise generated by the vehicle body. Thus, by adding a process corresponding to the angular velocity ω, the sound generation device 12 can be controlled by taking into consideration the effects of wind noise, etc.

If the angular velocity ω is below the threshold value (S191: Yes), the controller 8 determines that the occurrence of wind noise is infrequent, and proceeds to the process of Step S5. If the angular velocity ω is not below the threshold value (S191: No), the controller 8 determines that the occurrence of wind noise is frequent, and proceeds to the process of Step S6. By the above-described configuration, a parameter that affects the vehicle speed, such as the angular velocity ω, is considered instead of the angular acceleration A, so that the sound generation device 12 can be controlled in accordance with the volume of the wind noise, which is determined by the vehicle speed.

Embodiments of the present invention were described above, but the above-described embodiments illustrate only some of the application examples of the present invention, and are not intended to limit the technical scope of the present invention to the specific configurations of the above-described embodiments.

The invention claimed is:

1. An engine control method for controlling an engine installed in a vehicle provided with a wheel, a sensor that acquires rotation speed of the wheel, a motor that drives the wheel, a battery that supplies electrical power to the motor, and a generator that is driven by the engine and generates electrical power to charge the battery, the engine control method comprising:
    calculating an angular acceleration of the wheel based on a rotation speed of the wheel;
    obtaining a variation in the angular acceleration;
    determining whether the variation satisfies a prescribed stability criterion; and
    executing a drive control of the engine when a prescribed engine drive condition is satisfied, the prescribed engine drive condition including that the variation satisfies the prescribed stability criterion.

2. The engine control method according to claim 1, wherein
    the variation satisfies the prescribed stability criterion when the amplitude of the angular acceleration exceeds an amplitude threshold.

3. The engine control method according to claim 1, wherein
    the variation satisfies the prescribed stability criterion when a variance of the angular acceleration exceeds a variance threshold.

4. The engine control method according to claim 3, further comprising:
    increasing the variance threshold when the battery state of charge is higher than a first threshold; and
    decreasing the variance threshold when the battery state of charge is below a second threshold.

5. The engine control method according to claim 3, wherein
    the vehicle has a steering wheel used for operating the wheel, and
    the variance of the angular acceleration is corrected to be smaller as the operation amount of the steering wheel becomes larger.

6. An engine control device for controlling an engine installed in a vehicle provided with a wheel, a sensor that acquires a rotation speed of the wheel, a motor that drives the wheel, a battery that supplies electrical power to the motor, and a generator that is driven by the engine and generates electrical power to charge the battery, wherein
    the controller is configured to
    calculate an angular acceleration of the wheel based on a rotation speed of the wheel;
    obtain a variation in the angular acceleration;
    determining whether the variation satisfies a prescribed stability criterion; and executing a drive control of the engine when a prescribed engine drive condition is satisfied, the prescribed engine drive condition including that the variation satisfies the prescribed stability criterion execute a drive control of the engine when a prescribed engine drive condition is satisfied, the prescribed engine drive condition including that the variation satisfies the prescribed stability criterion.

\* \* \* \* \*